(12) United States Patent
Osenar et al.

(10) Patent No.: US 7,687,181 B2
(45) Date of Patent: Mar. 30, 2010

(54) CHANNEL-BASED ELECTROCHEMICAL CASSETTES

(75) Inventors: Paul Osenar, Westford, MA (US); Paul Sabin, Needham, MA (US); Mohammad Enayetullah, Sharon, MA (US); Richard M. Formato, Grafton, MA (US)

(73) Assignee: Protonex Technology Corporation, Southborough, MA (US)

( * ) Notice: Subject to any disclaimer, the term of this patent is extended or adjusted under 35 U.S.C. 154(b) by 1079 days.

(21) Appl. No.: 10/971,356

(22) Filed: Oct. 22, 2004
(Under 37 CFR 1.47)

(65) Prior Publication Data

US 2005/0244703 A1     Nov. 3, 2005

Related U.S. Application Data

(63) Continuation-in-part of application No. PCT/US03/12684, filed on Apr. 23, 2003.

(60) Provisional application No. 60/374,631, filed on Apr. 23, 2002.

(51) Int. Cl.
*H01M 2/02*  (2006.01)
*H01M 2/08*  (2006.01)
*H01M 8/00*  (2006.01)

(52) U.S. Cl. .............................. 429/36; 429/34; 429/35; 429/12

(58) Field of Classification Search ................. 429/34, 429/30, 35, 36
See application file for complete search history.

(56) References Cited

U.S. PATENT DOCUMENTS 3,846,176 A    11/1974    Kuhl
4,371,433 A     2/1983    Balko et al.

(Continued)

FOREIGN PATENT DOCUMENTS

EP          0 122 150 A2    10/1984

(Continued)

OTHER PUBLICATIONS

U.S. Appl. No. 09/854,362.
U.S. Appl. No. 09/855,018.

*Primary Examiner*—Dah-Wei D Yuan
*Assistant Examiner*—Zachary Best
(74) *Attorney, Agent, or Firm*—Christine C. O'Day; George N. Chaclas; Edwards Angell Palmer & Dodge LLP

(57) ABSTRACT

The present invention provides membrane cassettes and stacks thereof which are suitable for a use in a variety of electrochemical applications. The invention further provides membrane cassettes which comprise one or more bipolar plates which have one or two reactant or coolant flow fields consisting of at least one groove in opposing surfaces of the bipolar plate. In certain preferred embodiments, the invention provides cassettes and stacks which are suitable for use in fuel cell applications. Particularly preferred embodiments of the invention include design improvements which enhance the performance and reliability of certain components of the fuel cell stack.

47 Claims, 18 Drawing Sheets

U.S. PATENT DOCUMENTS

| | | | |
|---|---|---|---|
| 4,397,917 | A | 8/1983 | Chi et al. |
| 4,588,661 | A * | 5/1986 | Kaufman et al. ............... 429/36 |
| 5,110,691 | A | 5/1992 | Krasij et al. |
| 5,176,966 | A | 1/1993 | Epp et al. |
| 5,264,299 | A | 11/1993 | Krasij et al. |
| 5,453,331 | A | 9/1995 | Bloom et al. |
| 5,464,700 | A * | 11/1995 | Steck et al. ................... 429/30 |
| 5,523,175 | A | 6/1996 | Beal et al. |
| 5,527,363 | A * | 6/1996 | Wilkinson et al. ......... 29/623.1 |
| 5,922,485 | A | 7/1999 | Enami |
| 6,057,054 | A * | 5/2000 | Barton et al. ................. 429/42 |
| 6,080,503 | A | 6/2000 | Schmid et al. |
| 6,159,628 | A | 12/2000 | Grasso et al. |
| 6,165,634 | A | 12/2000 | Krasij et al. |
| 6,180,274 | B1 | 1/2001 | Yoshimoto et al. |
| 6,372,373 | B1 * | 4/2002 | Gyoten et al. ................. 429/35 |
| 6,413,664 | B1 | 7/2002 | Wilkinson et al. |
| 6,946,210 | B2 | 9/2005 | Osenar et al. |
| 2001/0001052 | A1 | 5/2001 | Bonk et al. |
| 2002/0028370 | A1 | 3/2002 | Suenaga et al. |
| 2002/0102453 | A1 * | 8/2002 | Suenaga et al. ............... 429/37 |
| 2002/0117780 | A1 | 8/2002 | Inoue et al. |
| 2003/0096153 | A1 | 5/2003 | Osenar et al. |
| 2003/0211378 | A1 | 11/2003 | Wald et al. |

FOREIGN PATENT DOCUMENTS

| | | |
|---|---|---|
| JP | 11-233128 | 8/1999 |
| WO | WO-02/43173 A1 | 5/2002 |
| WO | WO-02/093668 A1 | 11/2002 |
| WO | WO-02/093672 A2 | 11/2002 |
| WO | WO-03/092096 A2 | 11/2003 |
| WO | WO 2004/047210 | 6/2004 |

* cited by examiner

CHANNEL-BASED ELECTROCHEMICAL CASSETTES

This application is a continuation-in-part of International Application PCT/US03/12684, filed on Apr. 23, 2003, which in turn claimed the prior benefit of U.S. Provisional Patent Application 60/374,631, filed on Apr. 23, 2002.

FIELD OF INVENTION

This invention relates to membrane-based electrochemical cells, and more particularly, to proton exchange membrane (PEM) fuel cell stacks. The present invention also describes novel processes for producing these PEM fuel cell stacks.

BACKGROUND OF THE INVENTION

Membrane based electrochemical cells, and particularly, proton exchange membrane (PEM) fuel cells are well known. PEM fuel cells convert chemical energy to electrical power with virtually no environmentally harmful emissions and differ from a battery in that energy is not stored, but derived from supplied fuel. Therefore, a fuel cell is not tied to a charge/discharge cycle and can maintain a specific power output as long as fuel is continuously supplied. The large investments into fuel cell research and commercialization indicate the technology has considerable potential in the marketplace. However, the high cost of fuel cells when compared to conventional power generation technology deters their widespread use. The cost of fabricating and assembling fuel cells can be significant, due to the materials and labor involved. Indeed, as much as 85% of a fuel cell's cost can be attributed to manufacturing.

A single cell PEM fuel cell consists of an anode and a cathode compartment separated by a thin, ionically conducting membrane. This catalyzed membrane, with or without gas diffusion layers, is often referred to as a membrane electrode assembly ("MEA"). Energy conversion begins when the reactants, reductants and oxidants, are supplied to the anode and cathode compartments, respectively, of the PEM fuel cell. Oxidants include pure oxygen, oxygen-containing gases, such as air, and halogens, such as chlorine. Reductants, also referred to herein as fuel, include hydrogen, natural gas, methane, ethane, propane, butane, formaldehyde, methanol, ethanol, alcohol blends and other hydrogen rich organics. At the anode, the reductant is oxidized to produce protons, which migrate across the membrane to the cathode. At the cathode, the protons react with the oxidant. The overall electrochemical redox (reduction/oxidation) reaction is spontaneous, and energy is released. Throughout this reaction, the PEM serves to prevent the reductant and oxidant from mixing and to allow ionic transport to occur.

Current state of the art fuel cell designs comprise more than a single cell, and in fact, generally combine several MEAs, flow fields and separator plates in a series to form a fuel cell "stack"; thereby providing higher voltages and the significant power outputs needed for most commercial applications. Flow fields allow for the distribution of the reactants through the fuel cell and are typically separate from the porous electrode layers within the fuel cell. Depending on stack configuration, one or more separator plates may be utilized as part of the stack design to prevent mixing of the fuel, oxidant and cooling input or exhaust streams within the fuel cell stack. Such separator plates also provide structural support to the stack.

Bipolar plates perform the same function as an oxidant flow field, fuel flow field and separator plate in combination and are often used in the design of fuel cells as their use can reduce the number of components required in the functioning fuel cell. These bipolar plates contain an array of channels formed in the surface of the plate contacting an MEA which function as the flow fields. In the flow fields, the lands conduct current from the electrodes, while the grooves between the lands serve to evenly distribute the reactants utilized by a fuel cell, such as hydrogen, oxygen or air, over the faces of the electrodes. The channels formed by the lands and grooves also facilitate removal of liquid reaction byproducts, such as water. Fuel is distributed from the fuel inlet port to the fuel outlet port, as directed by the channels, on one face of the bipolar plate, while oxidant is distributed from the oxidant inlet port to the oxidant outlet port, as directed by the channels, on the opposing face of the bipolar plate, and the two faces are not connected through the plate. In the fuel cell stack, each bipolar plate serves to distribute fuel to one MEA of the stack through its fuel flow field face while distributing oxidant to a second MEA through the its opposite oxidant flow field face.

The particular design of the bipolar plate flow field channels may be optimized for the operational parameters of the fuel cell stack, such as temperature, power output, and gas humidification. Ideal bipolar plates for use in fuel cell stacks are thin, lightweight, durable, highly conductive, corrosion resistant structures such as carbon/polymer composites, graphite or certain metals.

A thin sheet of porous paper, cloth or felt, usually made from graphite or carbon, may be positioned between each of the flow fields and the catalyzed faces of the MEA to support the MEA where it confronts grooves in the flow field to conduct current to the adjacent lands, and to aid in distributing reactants to the MEA. This thin sheet is normally termed a gas diffusion layer ("GDL"), and can be incorporated as part of the MEA.

Fuel cell stacks may also contain humidification channels within one or more of the coolant flow fields. These humidification channels provide a mechanism to humidify fuel and oxidants at a temperature as close as possible to the operating temperature of the fuel cell. This helps to prevent dehydration of the PEM as a high temperature differential between the gases entering the fuel cell and the temperature of the PEM causes water vapor to be transferred from the PEM to the fuel and oxidant streams.

Of necessity, certain stack components, such as the GDL portion of the MEA, are porous in order to provide for the distribution of reactants and byproducts into, out of, and within the fuel cell stack. Due to the porosity of elements within the stack, a means to prevent leakage of any liquid or gases between stack components (or outside of the stack) as well as to prevent drying out of the stack elements due to exposure to the environment is also needed. To this end, gaskets or other seals are usually provided between the surfaces of the MEA and other stack components and on portions of the stack periphery. These sealing means, whether composed of elastomeric or adhesive materials, are generally placed upon, fitted, formed or directly applied to the particular surfaces being sealed. These processes are labor intensive and not conducive to high volume manufacturing, thereby adding to the high cost of fuel cells. Additionally, the variability of these processes results in poor manufacturing yield and poor device reliability.

Fuel cell stacks range in design depending upon-power output, cooling, and other technical requirements, but may utilize a multitude of MEAs, seals, flow fields and separator plates, in intricate assemblies that result in manufacturing difficulties and further increased fuel cell costs. These multitudes of individual components are typically assembled into one sole complex unit. The fuel cell stack is formed by compressing the unit, generally through the use of end plates and bolts, although banding or other methods may be used, such that the gaskets seal and the stack components are held tightly together to maintain electrical contact there between. These conventional means of applying compression add even more components and complexity to the stack and pose additional sealing requirements.

Other disadvantages observed in connection with some conventional fuel cell stacks are electrical in nature. For example, depending upon the configuration of the fuel cell and the degree of exposure of the MEA to the reactants and waste streams in the various manifolds providing reagents and coolants to the flow fields, a cross-cell potential problem may arise. In particular, if the exposure of the MEA to those reagents is significant, there may be a "shorting-out" of the MEA layer, thus resulting in poor performance of the fuel cell overall. Also, exposure of the MEA to some potential cooling fluids can be detrimental to the membrane portion. For example, in certain combinations of MEA and coolant, the coolant is capable of solvating or swelling the exposed portions of the membrane which can induce damage to the MEAs.

Various attempts have been made in the fuel cell art to address these deficiencies in fuel cell stack assembly design and thereby lower manufacturing costs. However, most require manual alignment of the components, active placement of the sealing means and/or a multi-step process.

Certain conventional processes are described in U.S. Pat. No. 6,080,503, to Schmid et al., U.S. Pat. No. 4,397,917, to Chi et al., and U.S. Pat. No. 5,176,966, to Epp et al. However, notable disadvantages have been associated with such conventional processes.

For example, U.S. Pat. No. 6,080,503, to Schmid et al. describes the replacement of gasket based seals within certain portions of the stack with an adhesive based material in the form of tapes, caulks or layers. However, assembly of that stack still requires manual alignment of the components during the adhesion process, in a manner not unlike caulking a seal, and sealing only occurs at those interfaces where adhesive has been applied through active placement.

Similarly, U.S. Pat. No. 4,397,917, to Chi et al., describes the fabrication of subunits within a fuel cell stack and is reported to provide ease in handling and testing. However, this design relies on conventional sealing among the components and between subunits. In addition, no manifolds internally penetrate the subunit.

See also, U.S. Pat. No. 5,176,966, to Epp et al., for its method of forming at least some of the required gaskets directly into the fuel cell stack assembly; and U.S. Pat. No. 5,264,299, to Krasij et al., which describes a fuel cell module having a PEM interposed between the two porous support layers which distribute reactant to the catalyst layers in which the peripheral portion of the support layers are sealed with an elastomeric material such that the PEM is joined with the support layers and the open pores of the support layers are filled with the elastomeric material making it fluid impermeable.

Additionally, World Publication WO 02/093672 describes a process for sealing fuel cell stacks via the injection of liquid resin. The reported process requires that all of the stack components be assembled first; then seals are introduced to produce the fuel cell stack. While that process may offer certain improvements to those previously described state of the art methods for forming fuel cell stacks, several deficiencies remain. In practice, for example, the process requires high injection pressures and is associated with slow fill times. High injection pressures further require component designs that protect the more fragile components of the stack (i.e. MEA). Another notable disadvantage is that a significantly large area of the each layer is necessarily sacrificed due to the sealing process itself.

Still further, in traditional fuel cell cassettes, two types of MEAs dominate; MEAs in which 1) the membrane extends beyond the borders of the gas diffusion layers, and 2) the gasket materials are formed into the edges of the MEA itself (with the membrane and GDLs approximately of the same size and shape, see for example U.S. Pat. No. 6,423,439 to Ballard). In the first type, separate gasket materials are used to seal between the membrane edge extending beyond the GDL and the other part of the stack (bipolar plates). In the second type, it is possible to seal directly to the other parts of the stack. Each of these methods requires compression to make a seal. These compressive-based seals require that all the components in the stack have high precision such that a uniform load is maintained. MEA suppliers have become accustomed to supplying the MEA formats above.

In our previous patent applications, we have reported on an innovative fuel cell stack design which assembles together individual modules to form a fuel cell stack of requisite power output where each module permanently binds a number of unit cells together (see World Publication WO 02/43173 which is incorporated herein by reference).

Briefly, WO 02/43173 details a three-step process for the formation of fuel cell cassettes which includes the following:

1) Sealing of unused manifold openings/ports on each of the particular flow fields (fuel, oxidant, and coolant). For example, in the case of the oxidant flow field, ports utilized for the distribution of fuel and coolant (on other layers) must be sealed about their perimeter to prevent the mixing of these input streams.

2) Sealing of all the ports within the membrane electrode assemblies to prevent the leakage of the reactants within the MEA layers.

3) Layering these components (appropriately sealed as described) within a mold or fixture in a method prescribed by the particular stack design. Once the pieces are assembled within the fixture, a resin is introduced about the periphery. Using vacuum transfer molding or injection molding techniques, the resin is forced into the edges of the cassette assembly. Once hardened, it provides structural support and edge sealing over the assembly.

The resulting fuel cell cassette is then transformed into a fuel cell stack with the addition of end plates. Such a construction provides appropriate manifolding and a means of compression.

Beyond that innovation, we also have developed innovative methods for sealing manifold ports within the stack or a module thereof, as well as methods for sealing the stack or module periphery that are less labor intensive and more suitable to high volume manufacturing processes (see World Publication WO 03/036747 A1 which is incorporated herein by reference).

Despite even our own advancements in the field, it would be desirable to provide an improved fuel cell stack design that is less complex, more reliable, and less costly to manufacture. Additionally, it would be highly desirable to provide a method of making fuel cell cassettes utilizing roll-to-roll production of MEA, particularly, as this would greatly reduce the cost of this component. It also would be highly desirable to develop improved fuel cell cassettes which minimize or prevent exposure of the MEA to the reactants, waste streams, or cooling fluids around the various manifolds, thus avoiding cross-cell potential problems or material incompatibility associated with that exposure. Additionally, it would be highly desirable to develop improved fuel cell stacks which can be formed at reduced injection pressures to simplify component design and which do not require that a significantly large area of the each layer to be sacrificed to accommodate the sealing process. Still further, design improvements which would enhance the performance and reliability of certain components of the fuel cell stack such as the current collectors and endplate fittings would be particularly advantageous. Such improvements would provide the end user with numerous operational and cost benefits as well.

SUMMARY OF THE INVENTION

The present invention provides notable improvements over conventional stacks and related processes, including those described above. In particular, the present invention provides improved electrochemical cassettes and fuel cell cassettes, including fuel cell stacks utilizing bipolar plates. Each sealed stack module, referred to herein as a "fuel cell cassette" or "electrochemical cassette" is an assembly of electrochemical components which has bonded internal manifolding and is sealed to form a self-contained unit. These electrochemical or fuel cell cassettes may be designed to achieve standardized specifications.

Preferred cassettes of the invention generally comprise at least one membrane electrode assembly adapted for contact with at least two plates, each plate comprising one or more flow fields. Each flow field comprises at least one groove which facilitates or otherwise enables flow therethrough. Individual flow fields are selected from oxidant flow fields, fuel flow fields, and coolant flow fields. In accordance with the present invention, each membrane electrode assembly and each plate comprise at least one oxidant manifold opening and at least one fuel manifold opening, with each respective manifold opening extending through the thickness of the cassette. Each plate preferably has at least one sealant channel which extends through at least a portion of the thickness thereof.

Also in accordance with the invention, the one or more membrane electrode assemblies and plates are assembled and encapsulated about the periphery thereof by a sealant. The sealant contemporaneously seals the respective channels of the one or more plates to selectively block those reactant manifold openings which are not intended to deliver material to a particular flow field. In that way, certain manifold openings within each particular layer selectively remain closed or open and undesired flow is reduced or eliminated.

Through the number, shape, and placement of sealant holes (optional) and channels cut or otherwise formed within the bipolar plate components of the fuel cell stack, sealing resin is introduced into the assembly to seal the perimeter of the assembly and to seal certain manifold ports within the assembly. Improved fuel cell stacks of the present invention can be manufactured from conventional fuel cell components and can utilize both injection molding and vacuum assisted resin transfer molding processes.

The present invention allows for the fabrication of fuel cell stacks with a minimum of labor, thereby dramatically reducing their cost and allowing for process automation. In addition, in the present invention the manifold openings are sealed by adhesion of the sealant to the fuel cell components, not by compression of the endplates or other compression means. This reduces the compression required on the final stack, improves the reliability of the seals, improves electrical contact and allows for the use of a wider variety of resins. Further, end plates may be molded into the fuel cell cassette thereby producing an entire stack (e.g., fuel cell cassette and end plates) in one step.

In one preferred embodiment, the present invention provides fuel cells having an MEA in which the GDL and membrane are of substantially the same general outline as each other and of the overall stack profile. One advantage of these fuel cells is the ability to directly use a roll-to-roll MEA without requiring any post processing.

By way of illustration, the sealing process occurs as follows. Sealant that travels through channels cut in the bipolar plates must not only bond to the adjacent MEA to create a seal but also penetrate the porous GDL portion to provide a gas and/or liquid tight seal between the bipolar plate and the non-porous ion conducting membrane. More particularly, only sealing to the surface of the GDL on the MEA may allow the reactant to travel through the GDL into areas of the stack that were intended to be sealed. This is of particular importance with the use of gaseous reactants (i.e. hydrogen), where the porosity of the GDL may allow significant escape. This may or may not be an issue in the case of liquid reactants (i.e. methanol) depending upon the nature of the fuel and the GDL.

In another preferred embodiment, the present invention provides fuel cells having a composite MEA. The composite MEA preferably comprises a gasket affixed to the periphery of the MEA laminate structure. In preferred fuel cells comprising the composite MEA, the outline of the peripheral gasket is approximately the same size as the outline of the stack profile. The active portion of the MEA is located roughly in alignment with the reactant flow fields above and below in the assembled stack. In such embodiments, the sealant channel(s) of the bipolar plate are typically aligned with at least a portion of the gasket portion of the composite MEA. In that way, undesirable exposure of the MEA to reactants, waste or coolant streams in the various manifolds is minimized or eliminated, thus avoiding cross-cell potential problems.

In yet another preferred embodiment of the invention, integrated tube fittings are used in place of the conventional threaded fittings which are routinely secured to the endplates of the stack. In accordance with this embodiment of the invention, each of the integral tubes has a sealing ridge which, when assembled, presses up against the endplate to form a seal. With compression of the stack assembly, the silicone (or other like material utilized for stack sealing) bonds to the lip of the sealing ridge.

This novel design feature eliminates the need for costly external fittings and enhances ease of assembly for the end user. Several other benefits are associated with the use of the integrated tube fittings. For example, tubing can be readily "cut to order" by the end user. Additionally, since there is no compression seal in the final assembly, per se, between the fitting and endplates, the opportunity for leakage is reduced or eliminated at that site. Still other advantages provided by this embodiment include an increased internal diameter, elimination of a flow restriction in that it allows significantly more flow per manifold area, resulting in a smaller overall product.

In yet another preferred embodiment of the invention, fuel cell stacks of the invention comprise encapsulated current collectors. The encapsulated current collectors offer several benefits relative to the conventional current collectors which may be exposed to the environment and internal fluids.

The current collectors in this embodiment are positioned internally on either side of the endplates of the stack; only their respective wire connections protrude from the stack assembly. In that way, the encapsulated current collector is not exposed to the environment or to internal fluids. It also is relatively inexpensive in that susceptible to corrosion, including copper, can be used with little or no degradation in performance. Further, the current collector is of a very simple, preferably rectangular, geometry which allows near 100% yield from sheet material. Additionally, the associated wires can be integrally connected to the current collector, thereby eliminating the need for additional fittings. An added benefit to the end user offered by the encapsulated current collector is that less resistance and power loss are experienced during operation.

Preferred methods for producing cassettes of the invention generally comprise providing the various components of the cassette (e.g., one or more MEAs and plates, each comprising respective manifold openings, as further described herein) in a size and number suitable for the intended application, assembling the components in a design configuration to support output requirements for that application; and introducing a sealant into certain channels cut into the plates. By sealing those channels, certain manifold openings which are not intended to deliver material to a particular flow field are selectively blocked, thus preventing or at least substantially reducing undesirable flow. In addition, the sealant can also encapsulate the perimeter of the assembly contemporaneously with the sealing of the channels.

Related aspects of the invention are discussed infra.

DETAILED DESCRIPTION OF THE INVENTION

The present invention provides a variety of cassettes suitable for use in electrochemical applications. As noted above, cassettes of the invention are particularly well suited for use in fuel cells.

Figure 1:
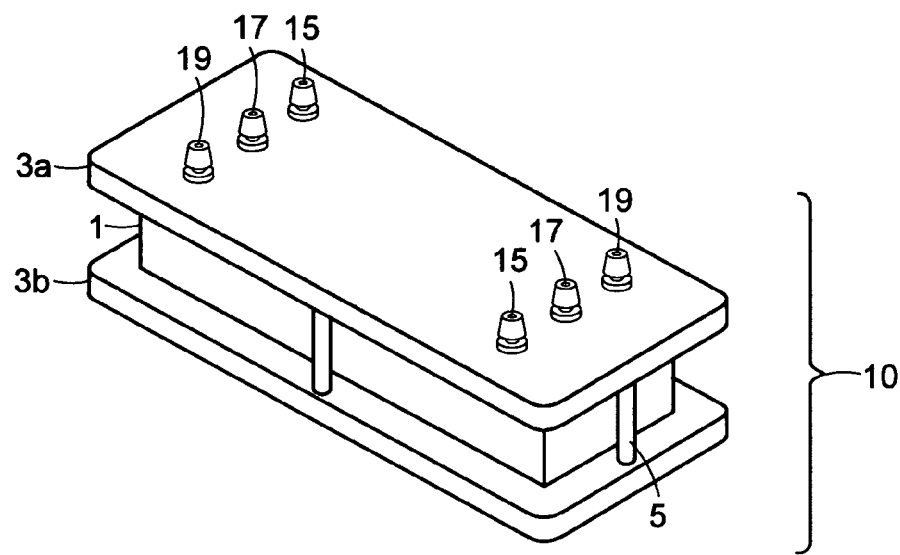
FIG. 1 is a pictorial view of one embodiment of a fuel cell of the present invention.

FIG. 1 shows one embodiment of a fuel cell stack 10 of the present invention. A fuel cell cassette 1, formed according to the methods described herein and comprising any number of MEAs, coolant flow fields and bipolar plates, is interposed between a top and bottom endplate 3a and 3b through a compression means 5. The fuel cell cassette may also utilize terminal plates or end plates at the top and bottom of the cassette, such terminal plates consisting of one-half of a bipolar plate structure (i.e. one flow field face only). MEAs may be fabricated from materials known in the art or purchased commercially. In a preferred embodiment, the MEA is manufactured by hot-pressing catalyzed carbon paper onto both sides of a NAFION perfluorinated sulfonic acid membrane (available commercially from E.I. DuPont de Nemours and Company, U.S.A.). Fuel 15, oxidant 19, and coolant 17 inputs and outputs are also shown.

In one preferred embodiment, all of the fuel cell components are cut to roughly the same shape perimeter. Two series of manifold openings or ports, an inlet opening and an outlet opening for each reactant flow, are cut in the MEAs and bipolar plates to provide manifolding for fuel and oxidant flow through the cassette. In an alternative embodiment, one or more coolant flow fields are also utilized, in which instance, an additional series of ports are cut in each component to provide for coolant input and output flow through the cassette. Sealing grooves are cut in each of the bipolar plates, and coolant flow fields if applicable, through which a sealant can be guided to close off unused ports contemporaneously with the sealing of the entire fuel cell assembly to form the fuel cell cassette. Using the shape and placement of the sealing grooves in each of the components, sealant flow into the component can be controlled. Grooves are not cut to surround ports that are not to be sealed on a particular layer.

Depending upon the length and geometry of the grooves, sealant flow from the edge of the assembly may not be adequate to completely seal off a port. In such instances, sealant holes are cut into the components and are utilized to draw additional sealant directly into the sealing grooves.

Figure 2:
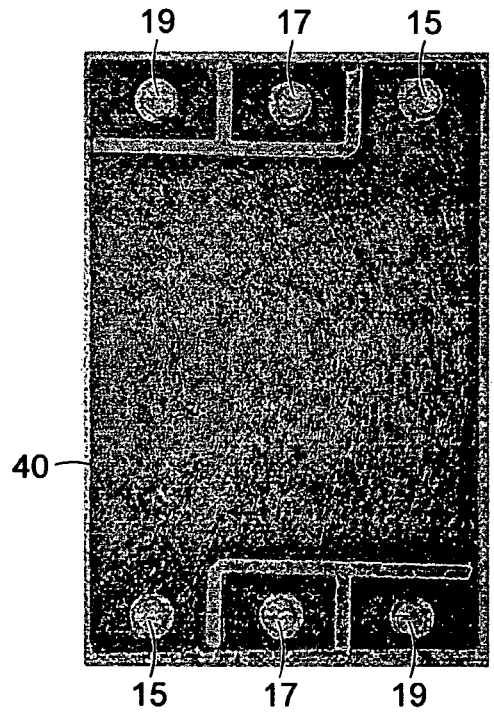
FIG. 2 is a photographic image of the fuel flow field face MEA after port sealing (disassembled from the cassette) in accordance with the present invention.

Due to the porous nature of the GDL within the MEA, sealant introduced into the sealing grooves of the bipolar plate interpenetrates the GDL to seal the manifold ports of the MEA. A photographic image of the fuel flow field face of an MEA 40 after sealing is shown in FIG. 2 wherein the MEA 40 has been cut from the cassette to show that the oxidant 19 and coolant 17 ports are sealed and the fuel ports 15 remain open. In conventional processes, the polymer membrane is required to extend past the GDL to provide a frame for sealing purposes. Consequently, this results in increased manufacturing costs. In contrast, the present invention allows sealing to occur when the GDL and polymer membrane are of substantially the same size and shape. This is advantageous as the MEAs used in the present invention may be fabricated on a continuous basis resulting in an associated reduction in manufacturing costs.

Figure 3:
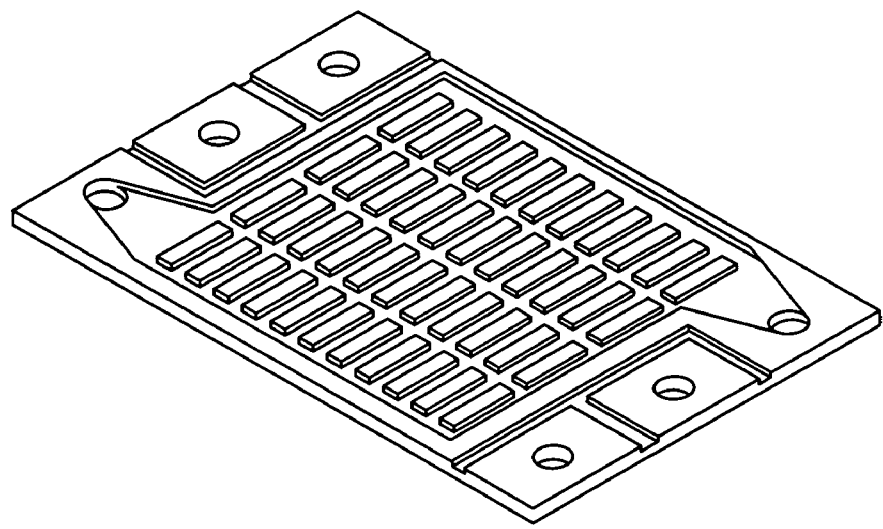
FIG. 3 is a pictorial top view of the fuel flow field face of a bipolar plate of the present invention.
Figure 3:
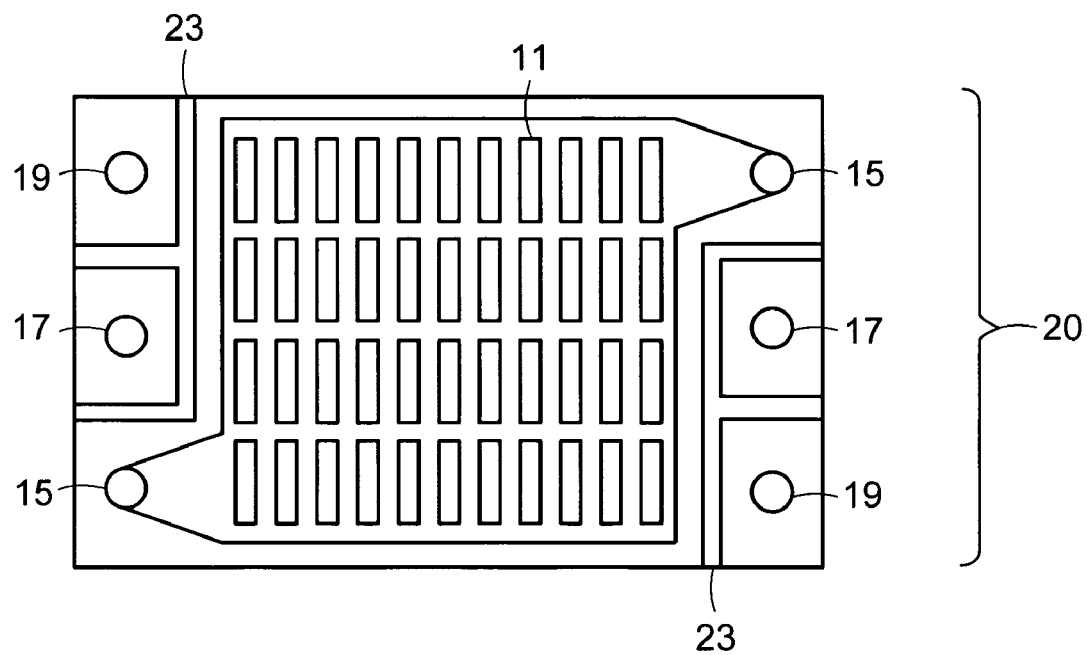
Figure 4:
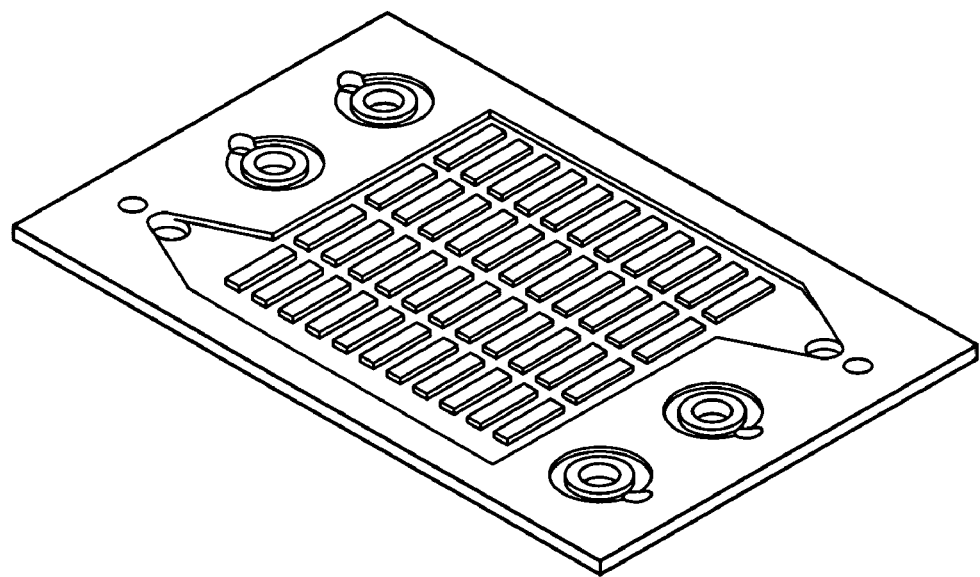
FIG. 4 is pictorial view of an embodiment of a sealing groove and sealant hole design for use with the present invention.
Figure 4:
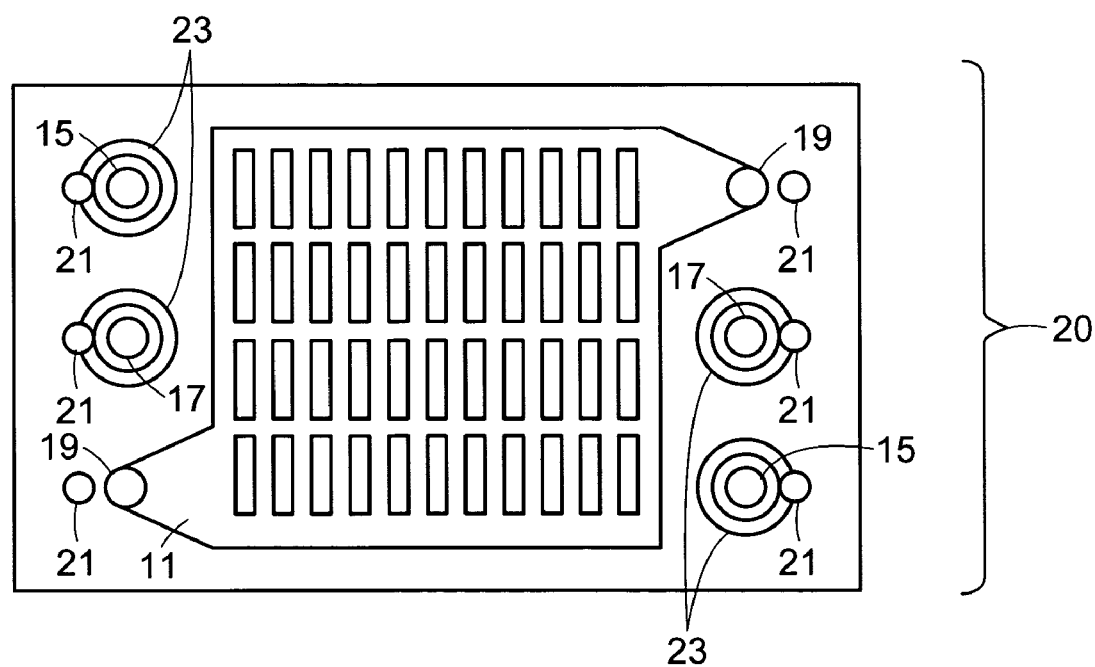
Figure 16A:
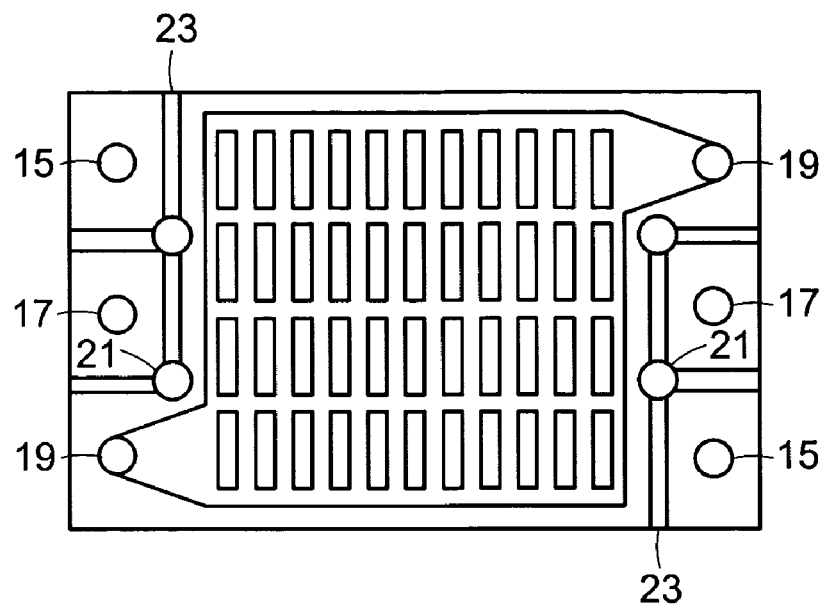
FIGS. 16A-B are schematic views of a bipolar plate oxidant or fuel flow field (FIG. 16A) and a coolant flow field (FIG. 16B)
Figure 16B:
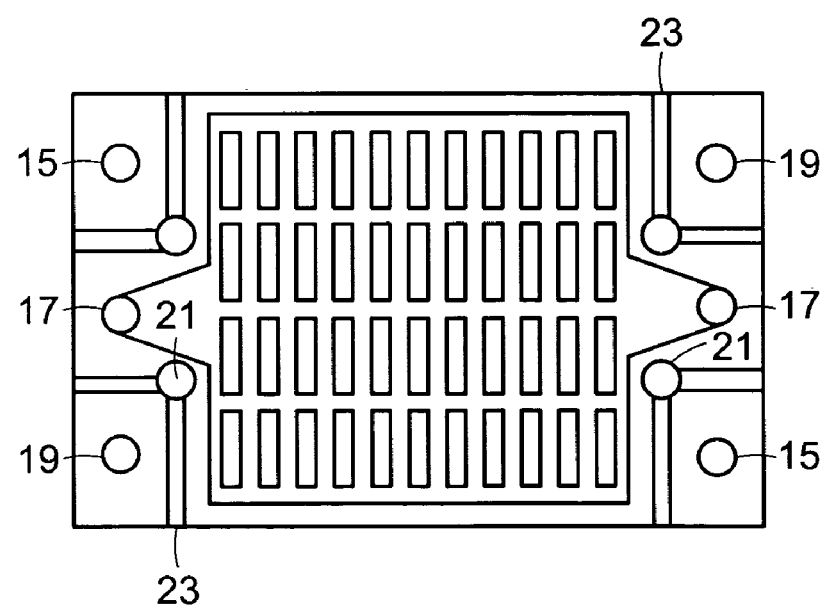

FIG. 3 shows a preferred embodiment of a bipolar plate having sealing grooves cut therein. The sealing grooves 23 are added to each side of the bipolar plate 20. Such sealing grooves 23 are not connected to the flow field channel pattern 11 on the bipolar plate 20 face as the flow field channel pattern 11 must remain unhindered to provide for proper reactant flow through the cassette. These sealing grooves 23 are designed such that in the fuel flow field face of the bipolar plate 20, the fuel ports 15 remain open to distribute fuel while the remaining oxidant 19 and coolant 17 ports are sealed. In the opposing oxidant flow field face of the bipolar plate 20, the oxidant ports 19 remain open to distribute oxidant while all other ports are sealed. In FIG. 4, the oxidant flow field face of the bipolar plate 20 is shown. Therefore, sealing grooves 23 surround the fuel inlet and outlet ports 15 and the coolant inlet and outlet ports 17, but not the oxidant inlet and outlet ports 19. (See also FIGS. 16A-B which provide schematic views of a bipolar plate oxidant or fuel flow field (FIG. 16A) and a coolant flow field (FIG. 16B)).

Referring now to FIG. 4, an alternative sealing groove 23 and sealant hole 21 design for a bipolar plate 20 is shown wherein sealant holes 21 are used and sealant is drawn (or pushed) from the sealant hole 21 into the sealing grooves 23 surrounding the fuel ports 15 and coolant ports 17 and sealant is drawn from the periphery of the assembly only to seal the periphery of the components. Sealant holes must also be added to the MEAs.

Figure 5:
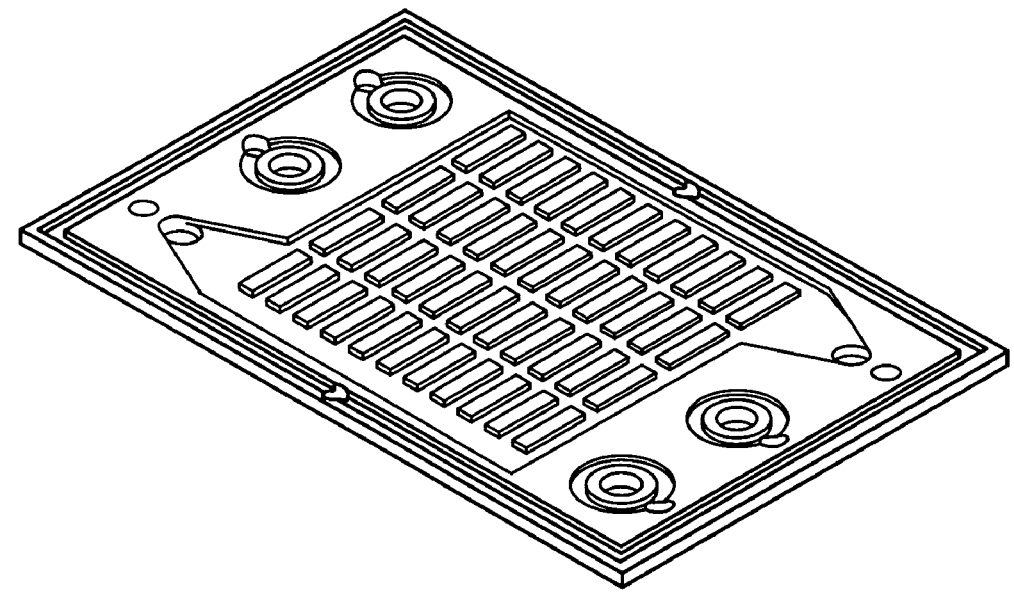
FIG. 5 is a pictorial view of another embodiment of a sealing groove and sealant hole design for use with the present invention.
Figure 5:
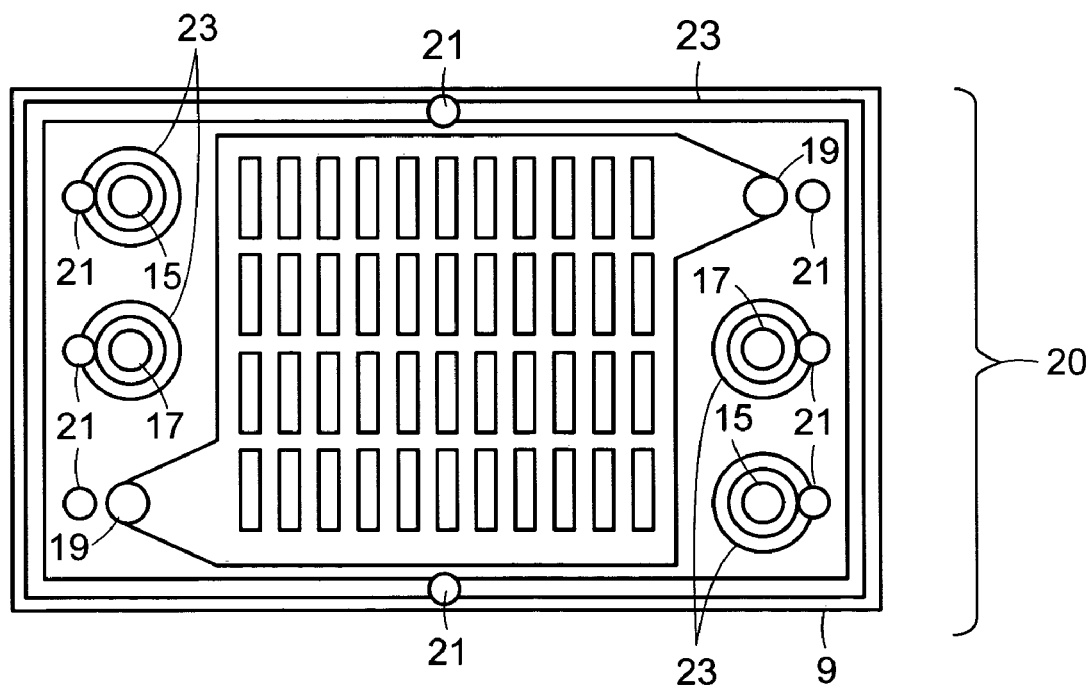

Another embodiment of a sealing groove and sealant hole pattern is shown on a bipolar plate 20 in FIG. 5. As shown, sealant is drawn from the sealant holes 21 to seal the fuel ports 15 and coolant ports 17. The perimeter 9 and the sealing grooves 23 surrounding the ports are isolated from the sealing groove about the periphery 9 of the assembly. In this embodiment, bonding of the perimeter does not require external encapsulation of the entire assembly, which may be advantageous for heat removal.

Figure 6:
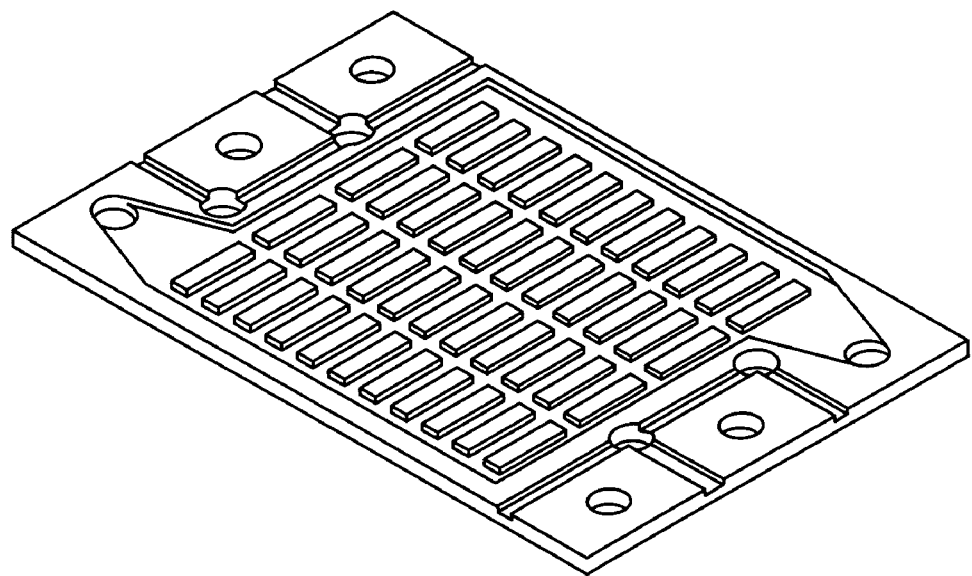
FIG. 6 is a pictorial view of yet another embodiment of a sealing groove and sealant hole design for use with the present invention.
Figure 6:
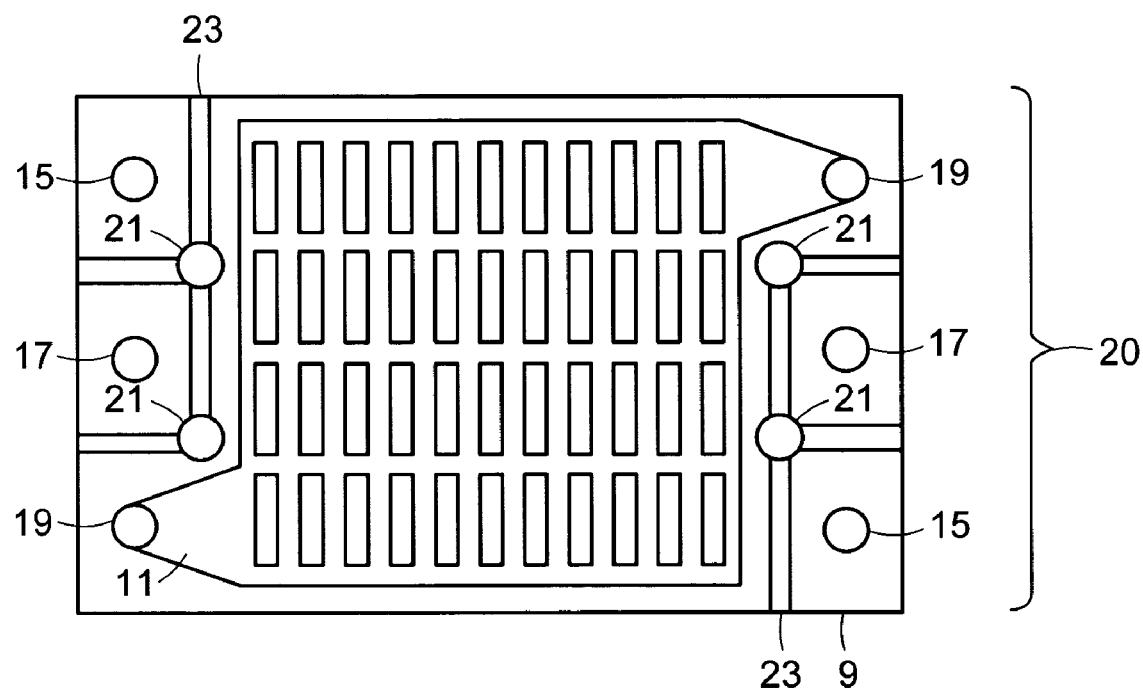

FIG. 6 depicts yet another embodiment of a sealing channel and sealant hole pattern in which the sealing grooves 23 are fed sealant from both the periphery 9 and through sealant holes 21 to seal the fuel ports 15 and coolant ports 17.

Once suitable sealant holes and/or sealing channels are cut or otherwise formed in each of the fuel cell components as described above, the components are assembled according to the desired cassette design and output requirements. Assembly of a fuel cell stack utilizing bipolar plates could include the use of terminal plates which incorporate one-half of a bipolar plate structure, i.e. only one flow field face.

Figure 7:
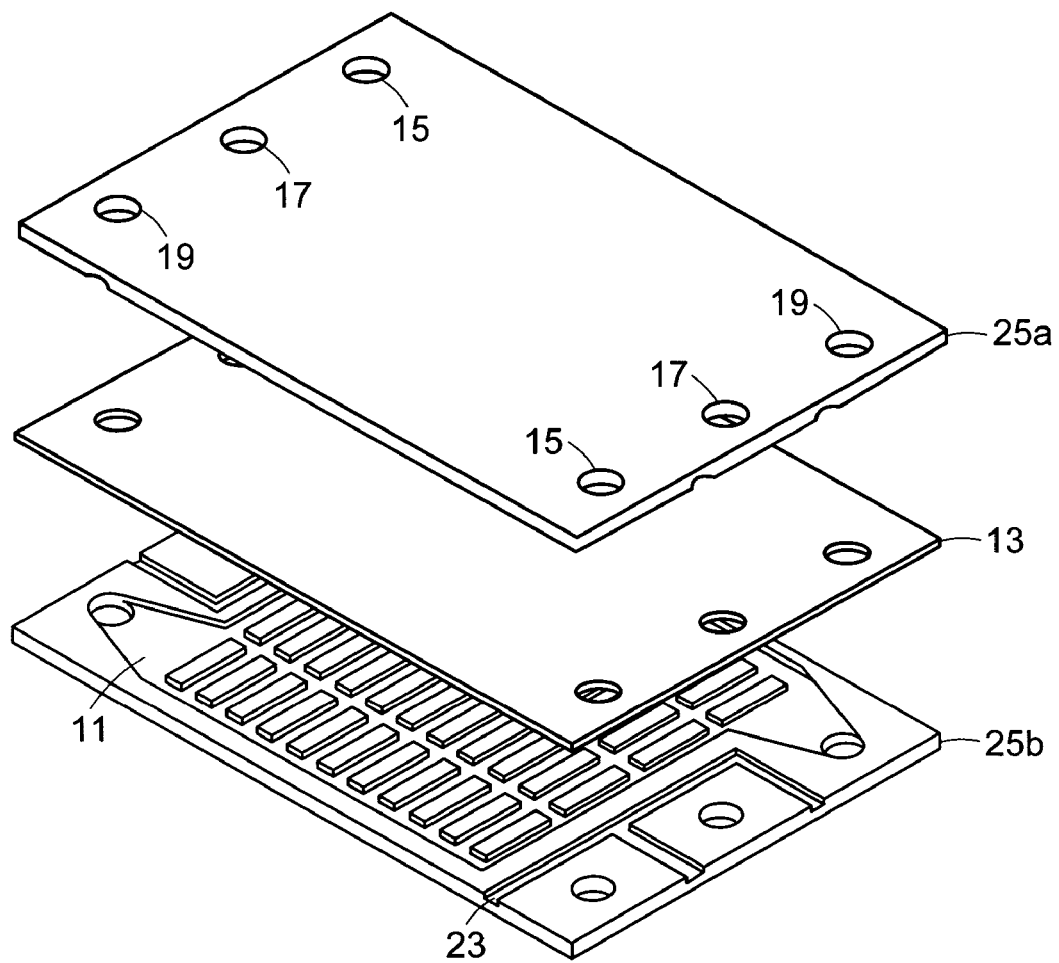
FIG. 7 is an exploded, schematic view of a simple fuel cell assembly for use with the present invention.

In a very basic assembly design, as shown in FIG. 7, an MEA 13 is interposed between two terminal plates 25a and 25b. However, in another preferred embodiment the assembly design comprises, in this order, a terminal plate, an MEA, a bipolar plate, a second MEA, and a second terminal plate.

Additional bipolar plates and MEAs may be added to the cassette assembly, with or without the addition of cooling layers depending upon the output requirements for the finished fuel cell. Typically, fuel cells having a plurality of MEAs comprise a repeat unit having a between 1 and about 10 MEAs interposed between coolant layers. More typically there are between about 2 and about 4 MEAs interposed between coolant layers which strikes a balance between maximizing MEA density and maintaining a sufficient heat removal throughout the cassette or stack.

Figure 17:
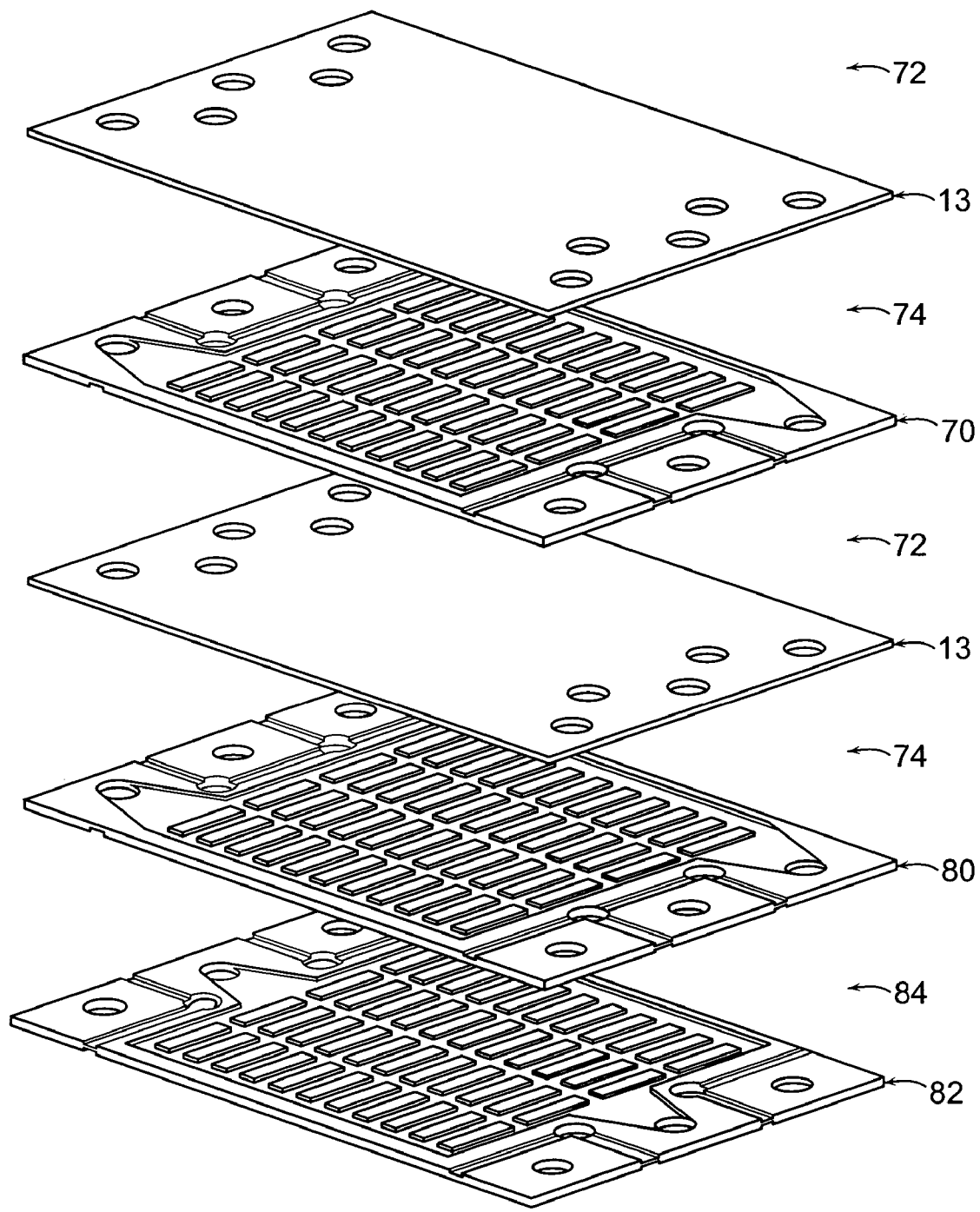
FIG. 17 is an exploded, schematic view of a repeat unit for a typical fuel cell cassette of the invention having one coolant flow field and two fuel cell unit cells (including an MEA, an oxidant flow field and a fuel flow field)

Now referring to FIG. 17, a particularly preferred repeat unit is depicted having two MEAs 13 interposed between adjacent coolant flow fields 84. The repeat unit comprises two MEA layers 13, one bipolar plate 70 having a fuel flow field 72 and an oxidant flow field 74, two bipolar plates 80 (and 82) having a coolant flow field 84 and either an oxidant flow field 74 (or a fuel flow field 72). Thus, bipolar plates 80 and 82, are related by a mirror plate running through the center manifold ports at either end of the plate. This coolant flow field 84 is substantially symmetric. The flow field on the opposite face of bipolar plates 80 and 82 is asymmetric and will form either a fuel flow field or an oxidant flow field depending upon whether the coolant flow field is the "up" surface, i.e., plate 82, or the "down" surface, i.e., plate 80. While the skilled artisan will recognize that other arrangements and structures of coolant flow fields may be readily determined and are within the scope of the invention, the structure shown in FIG. 17 is amenable to larger volume production at a reduced cost because there are fewer components and only two types of bipolar plates (e.g., plates 80 and 70).

For use in fuel cell applications, cassettes of the invention are typically utilized in the form of a stacked assembly comprising the following components: membrane electrode assemblies (MEA), flow fields, and separator plates.

Figure 8:
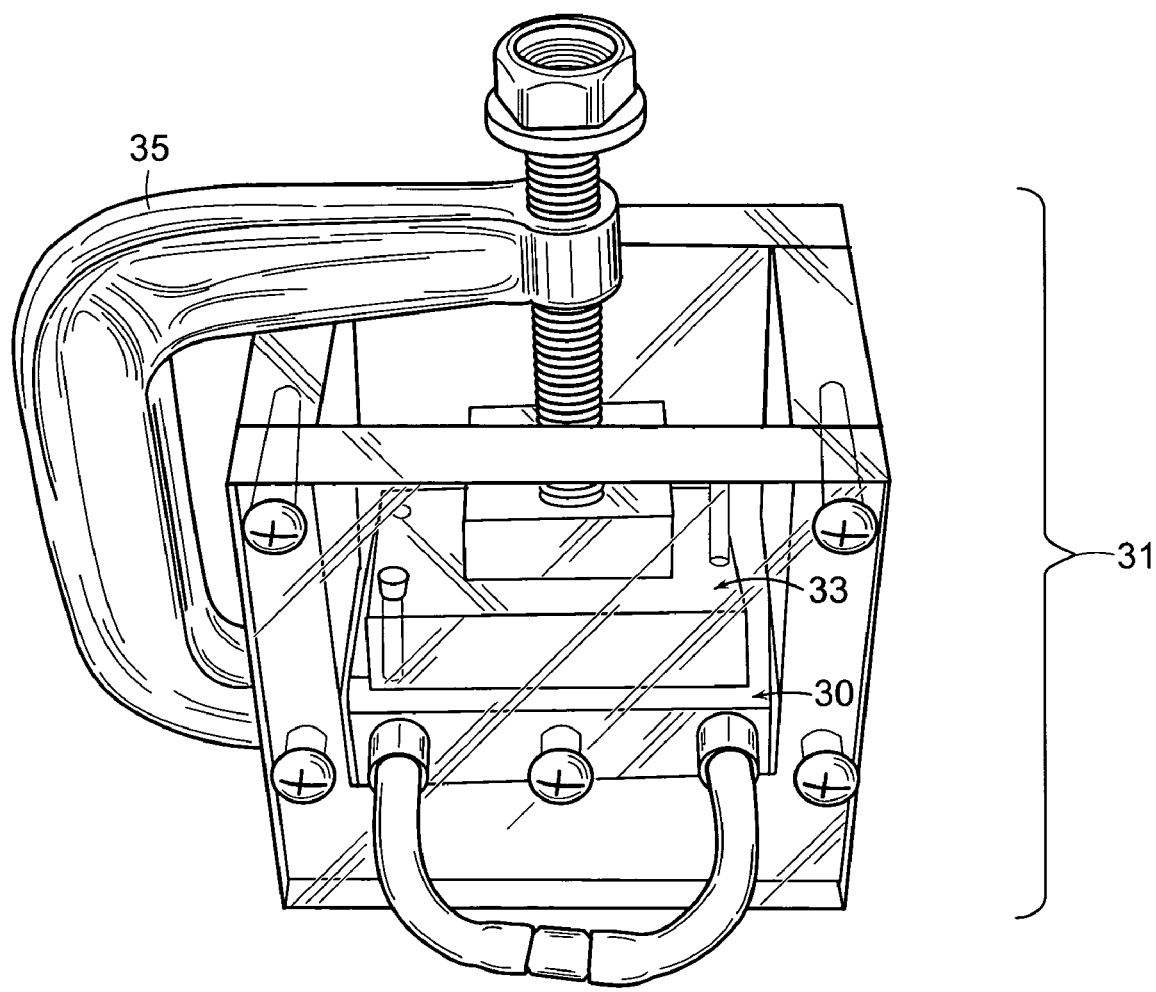
FIG. 8 is a photographic image of a fuel cell assembly within the mold and prior to encapsulation.

Although exemplary assembly designs have been described, those skilled in the art will recognize that fuel cells can have any desired number of components assembled together depending upon the output requirements of the final fuel cell cassette. Regardless of the particular design, the components are assembled such that the ports of each component in the assembly are aligned with the ports of the other components. As shown in FIG. 8, the assembly 30 is placed within a mold or cavity 31 and held in place within the mold by a top plate 33 with an appropriate means of compression 35, such as a simple clamp or bolt pattern. If sealant holes are utilized, the top plate will also contain holes through which the sealant can be introduced into the assembly.

To seal the fuel cell cassette assembly described above using vacuum assisted resin transfer molding techniques, a sealant is introduced around the perimeter and into the sealant holes of all assembled components. A vacuum is pulled through each of the ports within the assembly. The pressure differential pulls sealant into the edges of the assembly thereby sealing the periphery of the components in the assembly together and forming the assembly-into a finished fuel cell cassette. In addition, the same pressure differential pulls the sealant into the grooves cut in the bipolar plate. If sealant holes are present, the pressure differential pulls or otherwise draws the sealant through the sealant holes into the grooves. Sealant also permeates the GDLs of the adjacent MEAs from the grooves and edges. The perimeter and port sealing is complete when the sealant flows through the grooves to meet and seal off the appropriate ports and blinds the adjacent portions of the MEA. Throughout the cassette assembly, each flow field is appropriately sealed such that only the manifold ports of interest remain open on each individual layer. The remaining ports are selectively blocked/enclosed by the grooves that are now sealed. The edges of the assembly are also encapsulated by sealant. The pressure differential and time required to accomplish the sealing process is a function of the materials used for the components and the sealant, including but not limited to the shape of the sealing grooves, the viscosity and flow-characteristics of the sealant, and the type of gas diffusion layer used in the MEA.

Alternatively, one can use pressure assisted resin transfer to push a low viscosity sealant into the sealant holes and/or around the periphery of the assembly. Two part thermoset resins with a viscosity of under 150,000 cP, more preferably under 100,000 cP, allow filling of the sealing channels and the stack exterior with a minimum of driving pressure (<10 PSI) in very short fill times (<1 minute). In addition, design of the fuel cell components and the sealing channels is not complicated by the ramifications of high pressure filling techniques and tighter tolerances typically required.

To seal a fuel cell cassette using injection molding techniques, sealant is mechanically forced around the periphery of the assembly and into any sealant holes. In a preferred embodiment, a thermoset resin is utilized as the sealant and is injected into the injection holes and around the edges of the assembly and allowed to harden prior to removal of the fuel cell cassette from the mold. In another embodiment, a thermoplastic resin is utilized as the sealant. The sealant is injected into the injection holes and around the edges of the assembly and allowed to cool and harden prior to removal of the fuel cell cassette from the mold. A mold capable of accommodating the associated temperature and pressure is utilized.

Thus, methods of fabricating fuel cells and related electrochemical cassettes provided herein permit rapid prototype design and optimization. These fabrication methods are additionally suitable for low to medium volume production of electrochemical or fuel cell cassettes (i.e., <100,000 units) using either resin transfer or low pressure injection molding techniques. In particular, cassettes of the invention can be produced at reduced/low pressures. In addition, cassettes of the invention have an increased electrochemically active cross-section for a given cassette size. That is, less of the cassette has to be utilized (sacrificed) for sealing purposes.

The reduced cross-sectional area required of the low pressure sealing techniques of the invention permits greater flexibility in reagent delivery and removal from flow fields within the cassettes. Consequently, reagent depletion in the flow field is reduced or eliminated. Thus, for example, each flow field could be supplied with a reagent from two or more reagent manifolds and waste could be removed from the flow field via two or more exhaust manifolds.

Increased flow field design flexibility further permits increased cassette efficiency and further allows for scalability of cassette design. That is, the invention contemplates cassettes having larger or smaller power outputs generated from cassettes which are typically smaller than existing fuel cell stacks with a similar power output.

The sealant used for periphery and port sealing is selected such that it has the required chemical and mechanical properties for the conditions found in an operating fuel cell system, including but not limited to temperature stability. Suitable sealants include both thermoplastics and thermoset elastomers. Preferred thermoplastics include thermoplastic olefin elastomers, thermoplastic polyurethane, plastomer, polypropylene, polyethylene, polytetrafluoroethylene, fluorinated polypropylene and polystyrene. Preferred thermoset elastomers include epoxy resins, urethanes, silicones, fluorosilicones, and vinyl esters.

Figure 9:
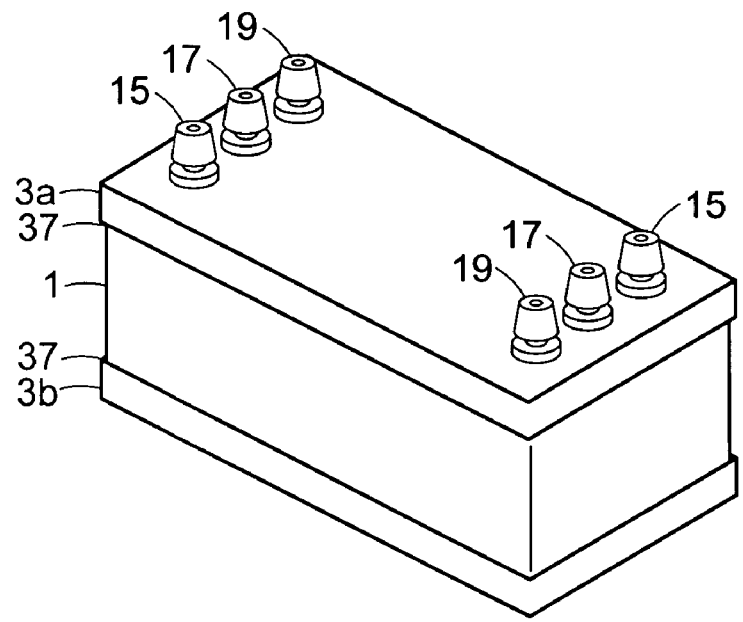
FIG. 9 is a schematic top and side view of a fuel cell cassette of the present invention having bonded endplates.

In an alternate embodiment shown in FIG. 9, endplates 3a and 3b are bonded 37 directly to the fuel cell cassette 1 during the sealing steps described above. Several benefits result from the use of this embodiment. Removing the need to compress the fuel cell cassette between end plates improves the reliability of the fuel cell stack and substantially decreases the weight. Also, the incorporated end plates can include fittings to further simplify the fuel cell stack. In one preferred embodiment, connections to external fuel, oxidant and coolant flows are added to the terminal plates used in the stack such that the terminal plates function as endplates for the stack.

Figure 13:
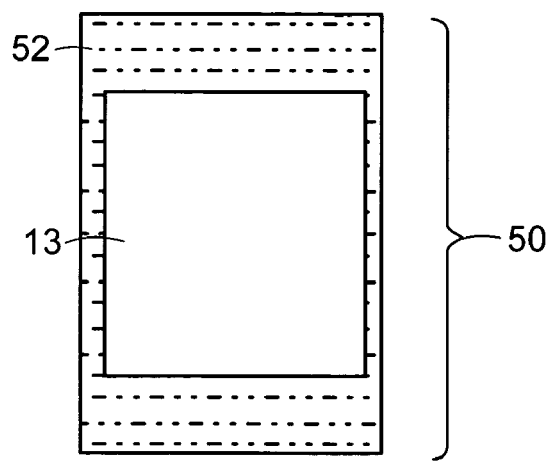
FIG. 13 is a pictorial top view of a composite MEA having a gasket region about the periphery of the MEA.

Now referring to FIG. 13, certain preferred composite membrane electrode assemblies suitable for use in the fuel cell cassettes of the invention comprise a laminated membrane electrode assembly 13 which is surrounded about the periphery with a gasket 52 composed of a thermoset or thermoplastic elastomeric material. Typically preferred are membrane electrode assemblies which have a gasket composed of a thermoset material, particularly a silicone material. Composite MEAs are commercially available. See, for example, customized MEAs prepared by the 3M Fuel Cell Components Program of 3M.

Other preferred composite membrane electrode assemblies comprise a laminated membrane electrode assembly having a portion of the catalyst layer (if any) and gas diffusion layer removed from the periphery such that the ion conductive layer is exposed about the periphery of the composite membrane electrode assembly.

Figure 10:
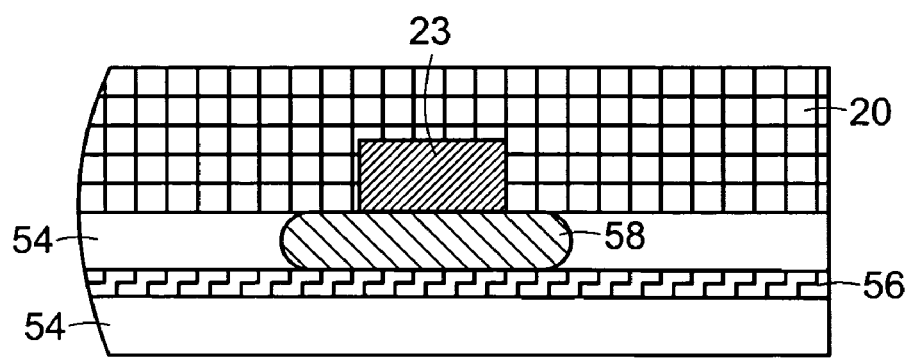
FIG. 10 is a cut away view of a channel seal adjacent to the GDL portion of the MEA.

Now referring to FIG. 10, certain vacuum assisted resin transfer and pressure assisted resin transfer molding techniques may be used in certain preferred embodiments to draw the sealant (introduced from the external edge outside the stack, or through sealant holes) into the sealing channels 23. Once the channels 23 are full of the sealant, further vacuum causes the sealant to be drawn into a portion of the GDL 54 in contact with the channel 23. Preferably the sealant forms a non-porous composite 58 with that portion of the GDL 54 in contact with the channel 23 such that the seal is liquid or gas tight. This embodiment of the invention is preferred in that it offers ease in terms of manufacturing. In particular, it requires few modifications to the MEA prior to cassette assembly and encapsulation. Thus, it is a preferred sealing means for large volume manufacture of fuel cell cassettes. It is noted that this particular embodiment requires a fairly complex interaction between the sealant and the GDL, and may require more extensive optimization. Ideally, the sealant should completely blind the pores of the GDL (this may not be necessary in all modes of operation). This interaction can be cumbersome in development, in that it requires that the chemical properties of the GDL (particularly any surface treatments) and the sealant to be compatible (i.e. typically blinding of the pores in the GDL requires the sealant to wet the GDL well). Thus, other sealing means disclosed infra may be preferable for low to medium scale production, e.g., production up to about approximately $10^4$ units.

Figure 11:
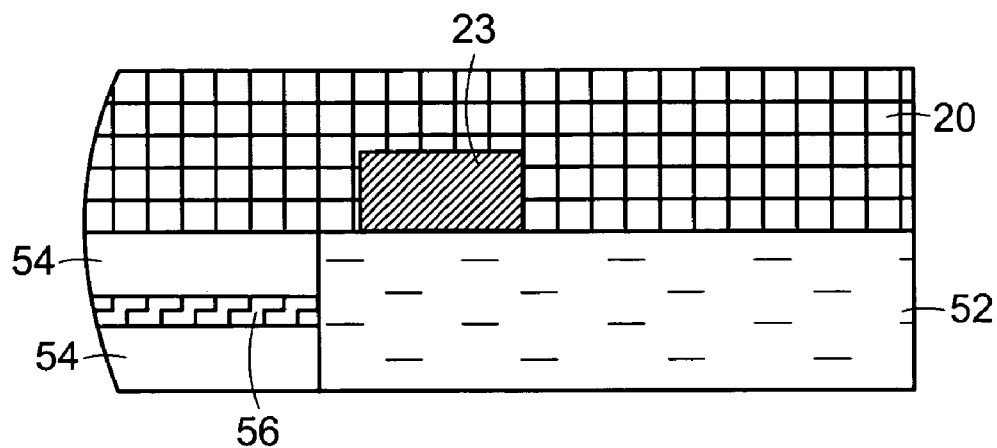
FIG. 11 is a cut away view of a channel seal adjacent to the edge gasket of an MEA.
Figure 12:
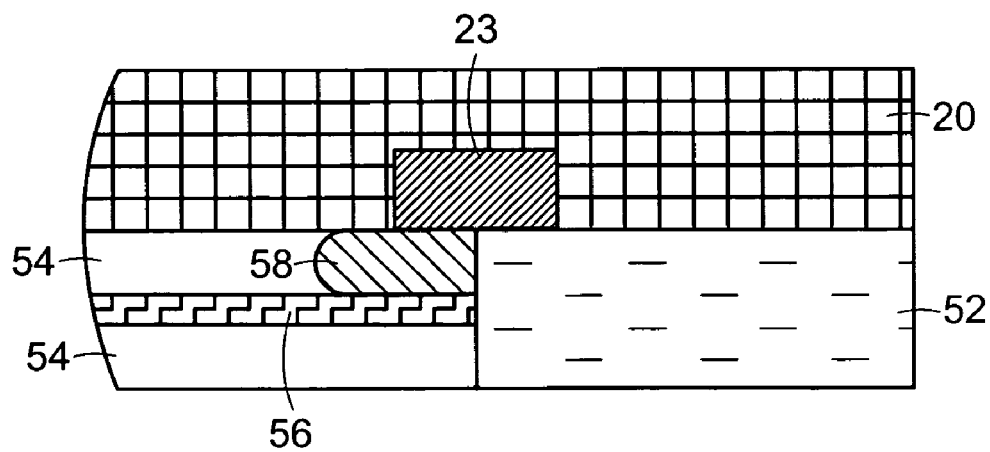
FIG. 12 is a cut away view of a channel seal adjacent to both the GDL and edge gasket of the MEA.

Now referring to FIG. 11 and FIG. 12, some alternatives exist to the direct execution above that may be advantageous both in manufacture of electrochemical cells as well as in their development. MEA suppliers are currently manufacturing composite MEAs 50 with incorporated edge gaskets 52 and/or membrane 56 edges that extend past the GDL layers 54. These composite MEAs 50 can be used directly in the channel sealing concept. Rather than have the sealant channel 23 adjacent to the GDL portion of the MEA 13, it can be positioned over the gasket 52 of the composite MEA 50 (see FIG. 11). Sealant drawn or forced into the sealant channel 23 can then form a seal directly with the material of the gasket 52 of the composite MEA 50. In certain embodiments this may be advantageous because it allows one to change the characteristics of the MEA (type of GDL, surface treatment) without concern for the direct interaction of the sealant and the GDL.

As provided in FIG. 12, another arrangement of sealant channels 23 relative to the gasket 52 surrounding the periphery of the MEA 13 can permit the sealant to bind to the GDL 54 and to a portion of the surrounding gasket 52. Thus, the sealing channel 23 is adjacent to the composite MEA 50 such that the channel 23 is exposed to both the gasket 52 as well as some portion of the GDL 54 (see FIG. 12). This is advantageous because the interaction of the sealant with the edge gasket can make a reliable seal without interacting with the GDL, and the sealant is still drawn into the GDL to form a composite 58 during processing (increasing the reliability of the sealing process).

Moreover, sealing against the gasket portion of the composite MEA minimizes or prevents exposure of a portion of cross-section of an MEA surface to a reagent not being introduced into the flow field in contact with that MEA surface. More particularly, the manifold openings providing fuel and oxidant are only exposed to the gasket portion of the composite MEA which is typically not electrochemically active. Thus, the surface of the MEA which is in contact with an oxidant flow field is precluded from exposure to the fuel on that surface because the laminated GDL/MEA structure of the composite MEA is not in contact with, for example, the fuel manifold.

In cassettes comprising a coolant manifold, the manifold opening is preferably only exposed to the gasket portion of the composite MEA. Such an arrangement reduces or precludes coolant induced damage to the MEA and/or the cassette.

A novel configuration of the present invention avoids the "shorting out" process observed in some fuel cell cassettes by exposure of a portion of the same surface of the MEA to oxidant and fuel. The shorting out process, caused in significant part by exposure of a portion of the same surface of the MEA to oxidant and fuel, results in reduced power output from the MEA layer, e.g., that portion of the MEA exposed to a reagent that is not being introduced into the flow field in contact with the MEA surface results in a reduction in the effective surface area of the MEA. Consequently, the fuel cell electrical output, which is proportional to the surface area of the MEA, also decreases.

In other fuel cells of the present invention which comprise a non-composite MEA, that is an MEA in which the MEA and GDL laminate extend to the periphery of the fuel cell stack, the manifold openings through the thickness of the MEA are cut to have a maximal cross-section without interfering with the function of the sealing channels of the bipolar plate. More particularly, the manifold openings through the MEA which correspond to the fuel or oxidant manifolds have been enlarged to a cross section which is about the same geometry as the area defined inside the portion of the GDL layer which has been blinded by the sealant within the sealing channels of the bipolar plate.

Figure 14:
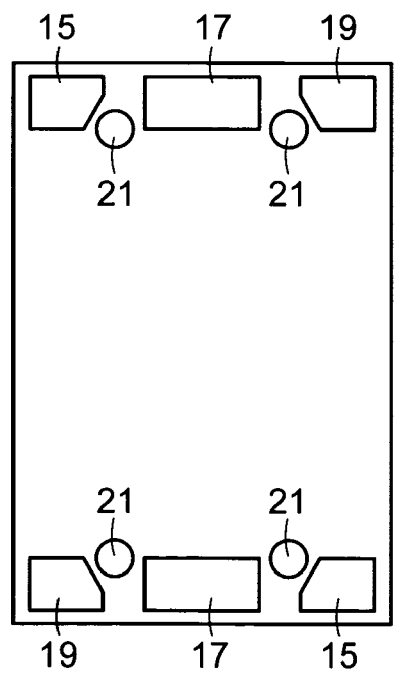
FIG. 14 is a pictorial view of an MEA having manifold openings which are substantially the same size as the area surrounding the manifold openings defined by the sealant after blinding of the GDL portion of the MEA in the sealing operation.

Referring to FIG. 14, apertures 15, 17, and 19 in the MEA which align with the fuel, oxidant and optionally the coolant manifolds have a cross section which is maximized. In that way, little or no portion of the MEA is exposed to oxidant or fuel present in the oxidant or fuel manifold. Although not wishing to be bound by theory, it appears that by minimizing the exposure of the MEA to the reactants and waste streams in the various manifolds providing reagents and coolants to various flow fields of the fuel cell provides increased electrical power generation without increasing the size of the MEA in contact with the flow fields.

Figure 18:
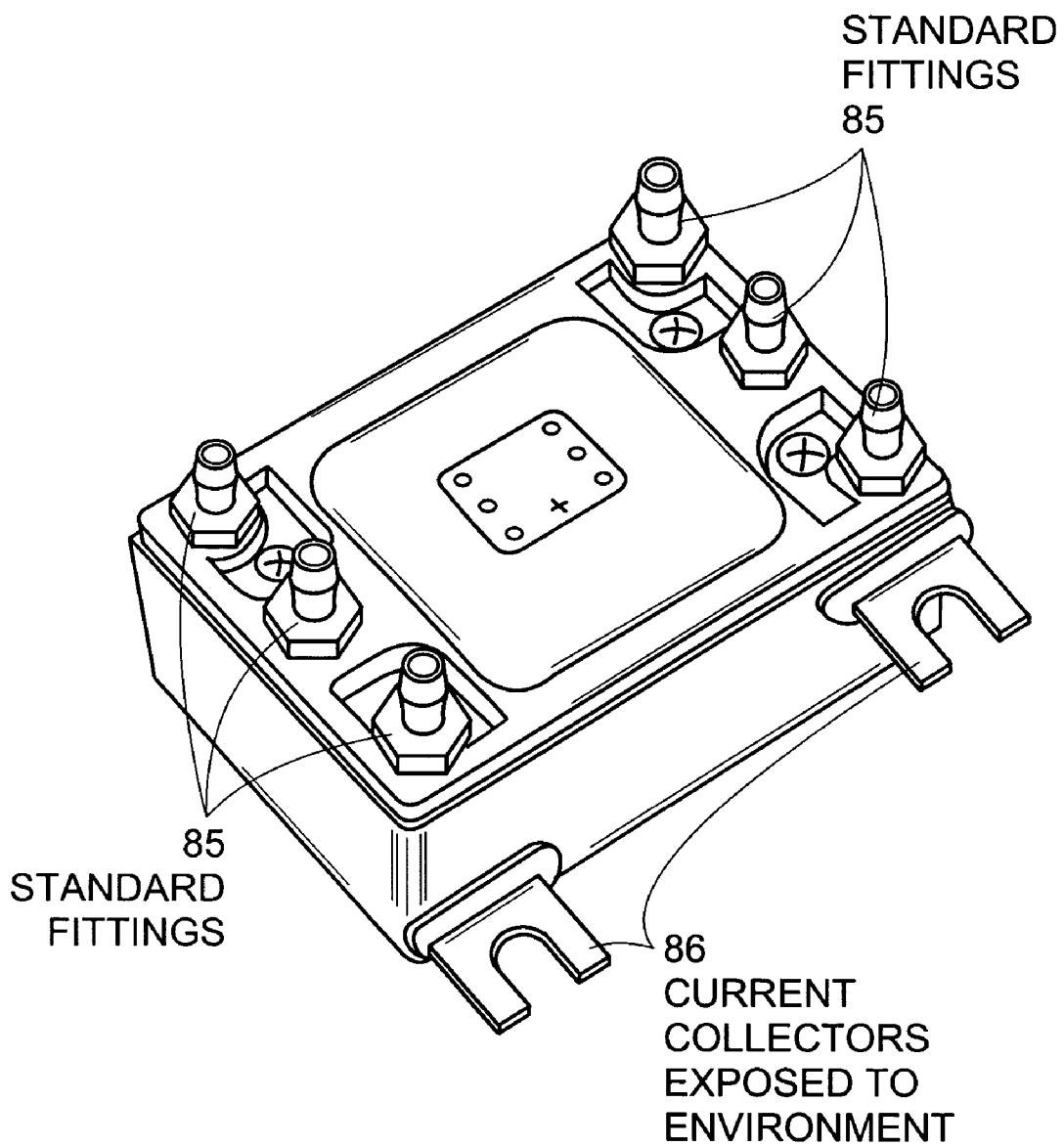
FIG. 18 shows an assembled fuel cell stack in accordance with the present invention with standard threaded fittings in which current collectors are exposed to the environment.
Figure 19:
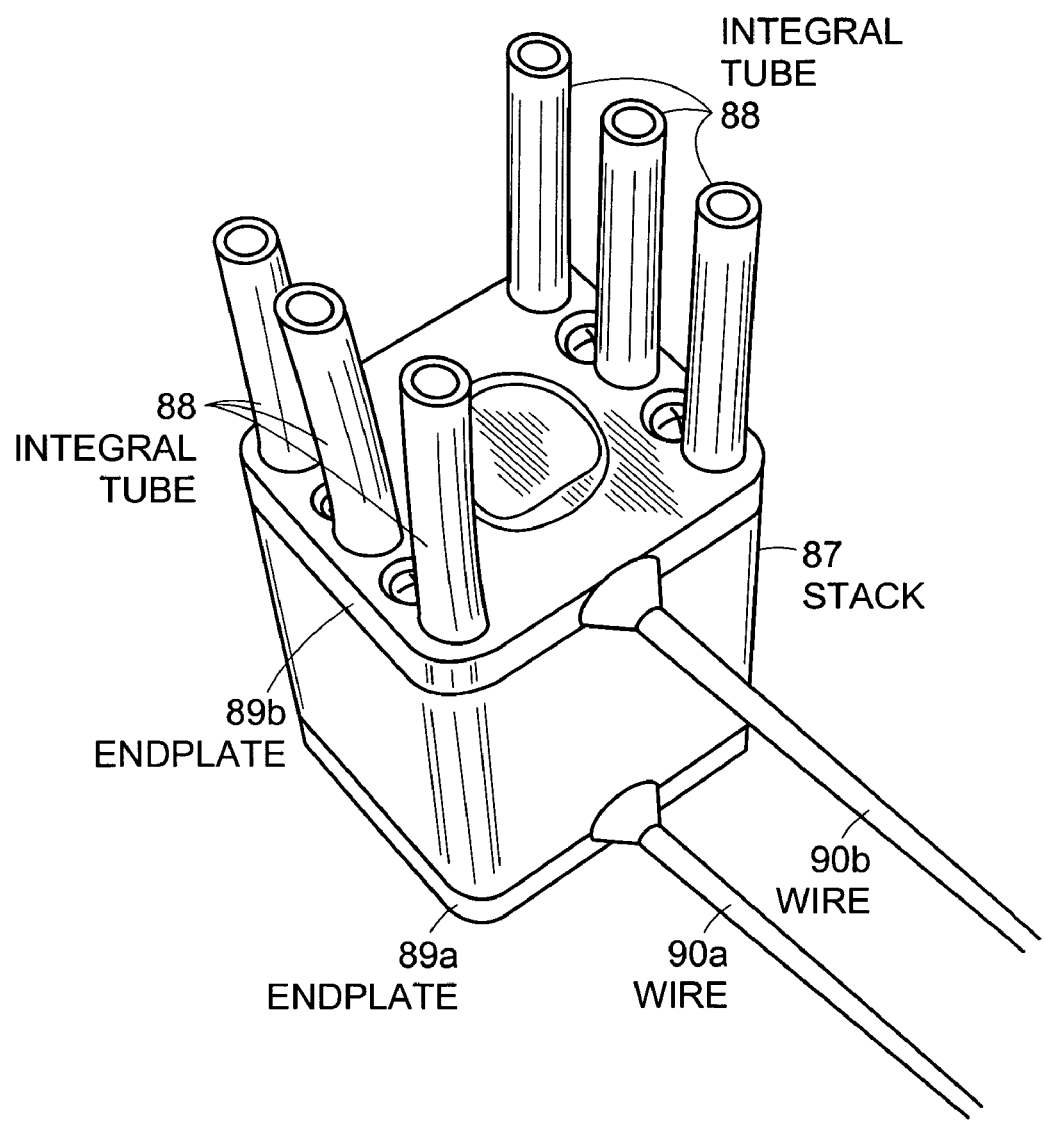
FIG. 19 shows dual aspects of an alternate preferred embodiment of a fuel cell assembly of the present invention in which the current collectors are encapsulated within the fuel cell stack and integrated tube fittings/integral tubes are employed in lieu of standard threaded fittings.

FIGS. 18-20 illustrate yet another preferred embodiment of the present invention. Referring initially to FIG. 18, a fuel cell stack assembly in accordance with the present invention is shown to include a plurality of standard threaded fittings 85. These fittings correspond to respective inlet and outlet ports for fuel, coolant (optional) and oxidant (as are depicted in several other figures as features 15, 17 and 19). Such fittings are routinely secured to the endplates of the stack. In particular, these fittings are typically screwed into the stack endplate; supply hoses (tubing) are then connected to the fittings.

However, these fittings tend to be very expensive and also are a point of possible leakage. In particular, the standard fitting/endplate interface can and does leak, at least to some extent. Additionally, fluid flow is restricted by the fitting's internal diameter. Moreover, since the fitting and endplate are exposed to fluid flow, both need to be made of "fuel cell friendly materials", e.g., materials that are non-corrosive and non-contaminating.

Two conventional current collectors 86 also are shown protruding from the assembly. As will be appreciated by those skilled in the art, conventional current collectors may be integrated or non-integrated with external wire connections. Several drawbacks are associated with conventional current collectors. One disadvantage is that they may be exposed to both the environment and internal fluids. If the material used as the current collector is a material susceptible to corrosion, e.g., copper, performance will diminish over time. Alternately, a non-corrodible material such as gold may be employed. However, such material is typically quite expensive and not mechanically robust. Additionally, the wire connections used cause increased resistance and subsequent power loss. Consequently, there is added assembly work for the end-user and it remains a possible failure point (e.g., if the electrical connection becomes disconnected/fails, etc.).

Referring now to FIG. 19, an alternate preferred embodiment of the present invention is shown. This embodiment addresses drawbacks associated with both the conventional fittings and current collectors. In FIG. 19, stack assembly 87 is shown to include a plurality of integral tubes 88. Similar to the standard fittings discussed above, these integral tubes correspond to respective inlet and outlet ports for fuel, coolant and oxidant. The current collectors in this embodiment are positioned internally on either side of the two endplates 89a and 89b with their respective wire connections 90a and 90b protruding from the stack assembly 87.

Figure 20A:
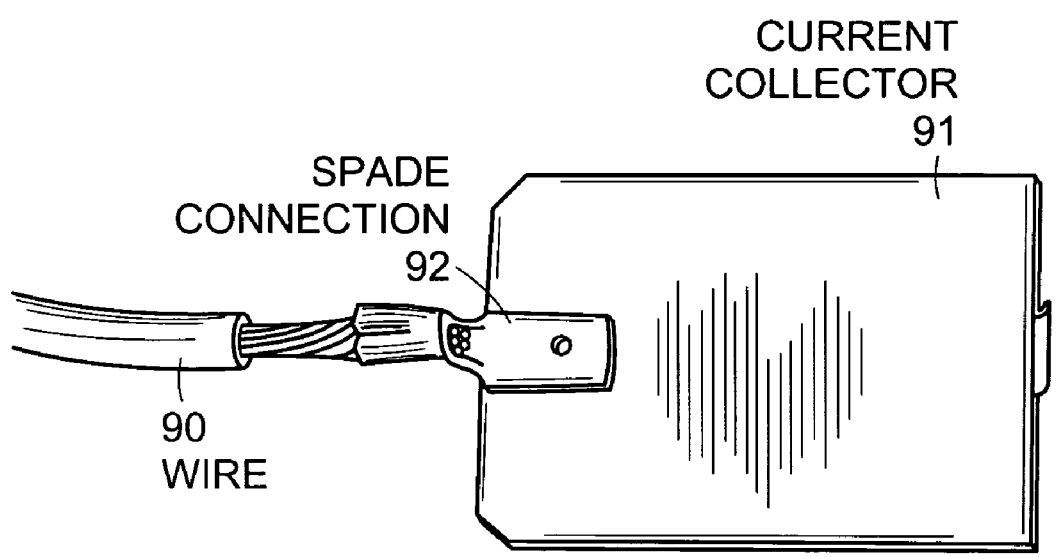
FIGS. 20A-C illustrate internal features of the embodiment of FIG. 19, including the current collector prior to encapsulation and the lower portion (including the sealing ridge) of an integral tube.
Figure 20B:
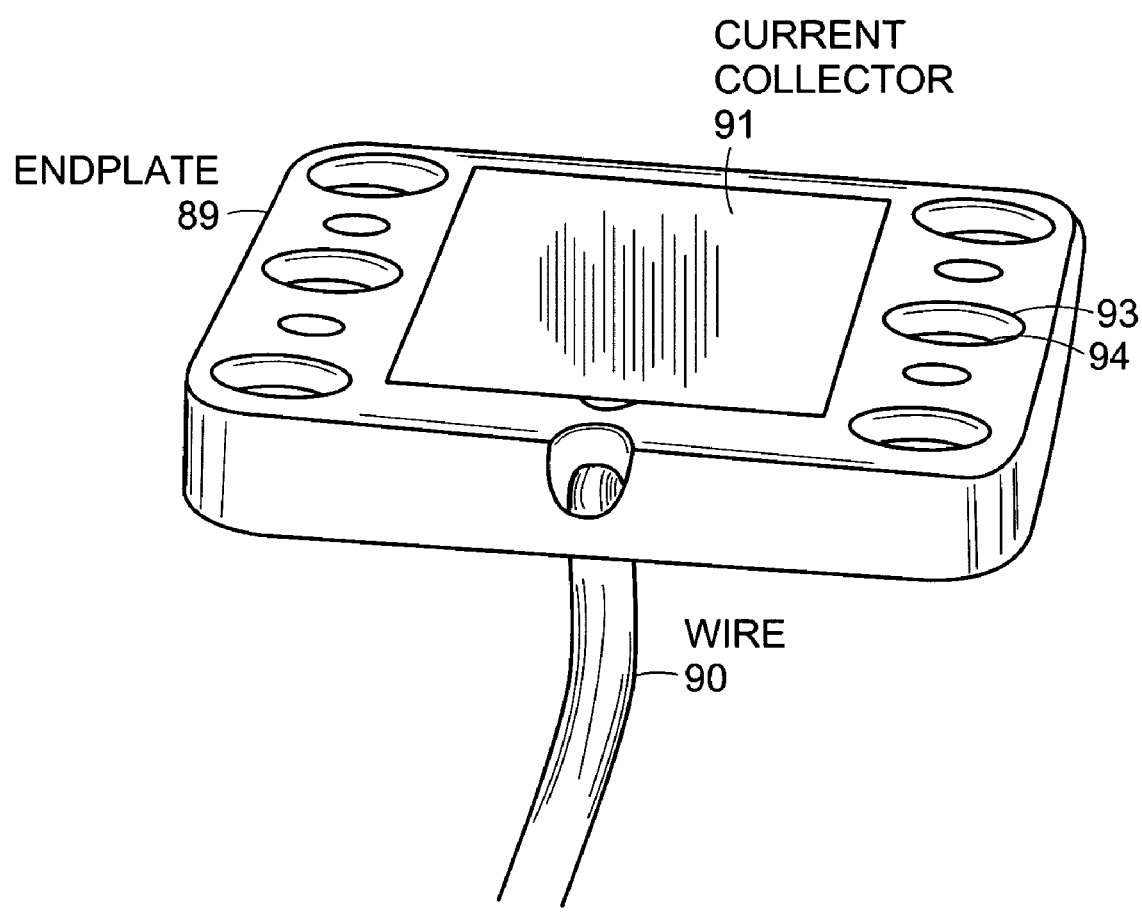
Figure 20C:
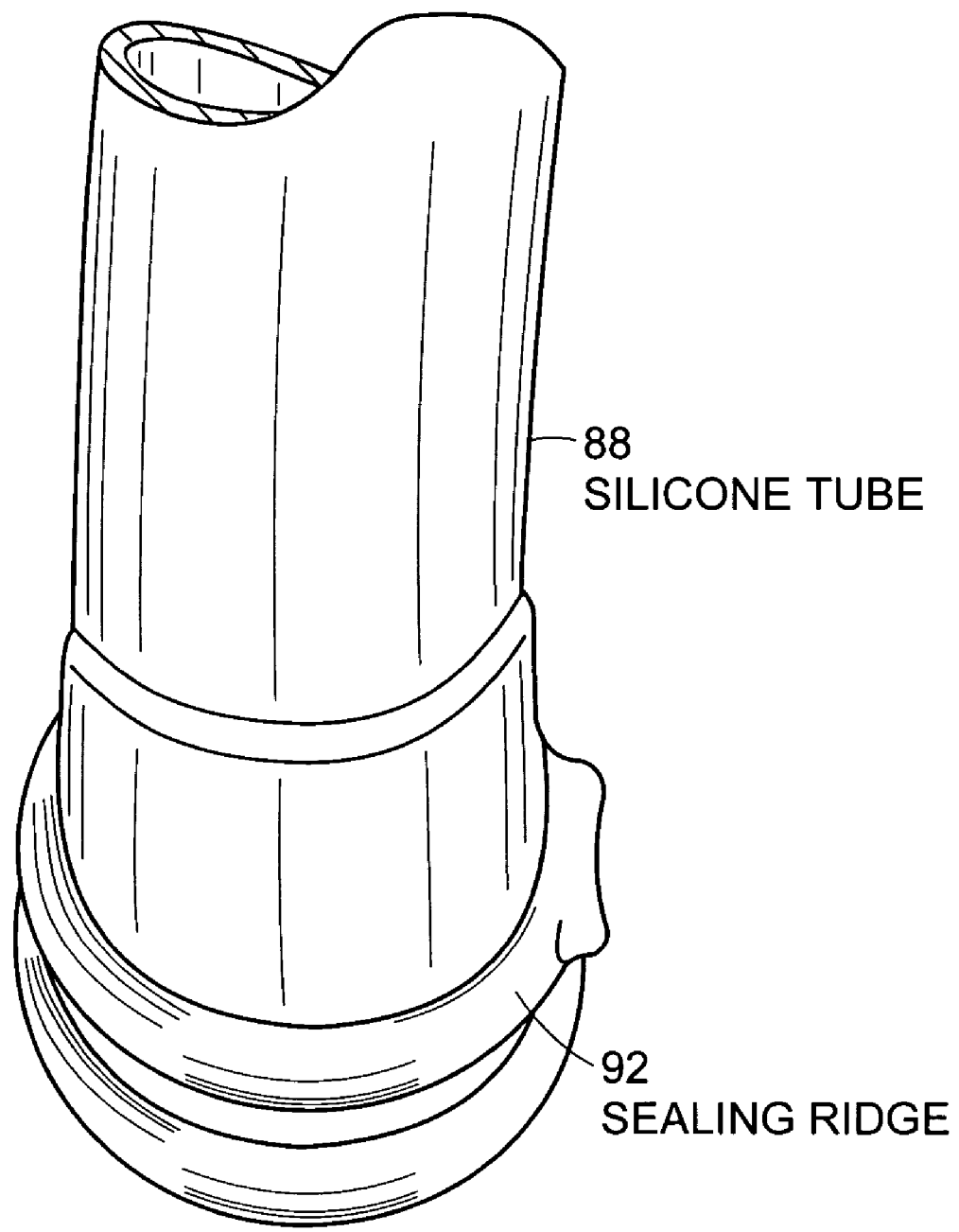

FIGS. 20A-C illustrate certain features of this embodiment which are not apparent in FIG. 19. In particular, FIG. 20A shows current collector 91 having a spade connection and wire 90 connected via a soldier joint (both mechanically rugged and with low electrical resistance). FIG. 20B shows current collector 91 positioned on the interior of endplate 89. Once the stack is assembled, the current collector 91 is effectively encapsulated into the stack via the sealing process.

FIG. 20C shows an integral tube 88 having a sealing ridge 92 which, when assembled, presses up against the endplate to form a seal. Referring again to FIG. 20B, each of the manifold openings 94 provides a corresponding depression 93 which mates with the respective sealing ridge 92. With compression of the stack assembly, the silicone (or other like material utilized for stack sealing) bonds to the lip of the sealing ridge.

Referring to both FIG. 20B-C, in this particularly preferred embodiment, gold has been coated with copper. Indeed, rather than coating each individual current collector, we have found that it is preferable to coat a whole sheet with gold, then cut out the current collectors. (If the current collector was exposed to the fuel cell environment, the copper exposed at the edges would be problematic.)

As will be appreciated by the skilled artisan, a variety of conductive materials may be utilized for the current collectors. Copper is generally preferred due to its conductivity and inexpensive cost. The materials utilized for the integral tubes also will vary widely, with silicone being particularly preferred.

Several advantages of the dual aspects of this embodiment are noteworthy. With reference to the encapsulated current collector, the current collector described in this embodiment is not exposed to the environment or to internal fluids. It is relatively inexpensive in that materials susceptible to corrosion, including copper, can be used with little or no degradation in performance.

The current collector is of a very simple (rectangular) geometry which allows near 100% yield from sheet material. Cutting costs also are decreased significantly. Additionally, wires can be integrally connected to the current collector, thereby eliminating the need for additional fittings. Less resistance and power loss are experienced as well.

With reference to the integrated tubing advancement afforded by the present invention, several distinct advantages are apparent. For instance, the need for costly external fittings is eliminated. Ease of assembly for the end user is enhanced. Additionally, the tubing can be "cut to order", providing a further benefit to the end user in terms of ease of integration. Moreover, since there is no compression seal in the final assembly, per se, between the fitting and endplates, possible leaks are reduced or eliminated at that site. Indeed, the unique features of this embodiment eliminate the need to seal the ports to the endplate. Also, there is no need to provide endplates made of fuel cell friendly non-corrodible materials (as the endplates are no longer exposed to fluid flow), nor is there a need to prime the endplates. In comparison to the use of standard threaded fittings, the integral tubes described can have a larger internal diameter for the amount of space taken up on the end plate. Elimination of the flow restriction is not insignificant in that it allows significantly more flow per manifold area, resulting in a smaller overall product. A reduction in cost is inevitable as well.

While the encapsulated current collector and integrated tube fittings are addressed in combination, the skilled artisan will appreciate that these dual aspects of the invention need not be combined in any one embodiment. Both address distinct components of the fuel cell stack and could be readily practiced independent of one another.

In another aspect, the present invention provides stacks suitable for use in fuel cells, electrochemical or ion exchange applications. Stacks of the invention comprise at least one cassette of the present invention, and at least one end plate having openings which align with the reagent manifold openings of the cassette. Each cassette is assembled relative to each other such that the reagent manifold openings are aligned. The end plate is assembled on the top and/or bottom of the stack of fuel cell cassettes such that the openings in the end plates align with the reagent manifold openings.

The means by which the end plates and fuel cell cassettes are assembled to form the fuel cell stack provided by the present invention is not particularly limited and may include compression gasket seals and co-encapsulation in a resin and/or sealant. In preferred embodiments, the end plate is assembled with the fuel cell cassette prior to encapsulation by the resin and prior to introduction of the sealant such that the end plate and fuel cell cassette are encapsulated and sealed in combination, e.g., simultaneously.

In other preferred embodiments of the present invention, one or more fuel cell cassettes are manufactured, then aligned in a stack together with one or more compression gaskets and end plates. A compression means such as through bolt, tie downs or other mechanical fasteners are attached to the fuel cell stack to mechanically seal the fuel cell cassettes and end plates.

The layer size and number of layers in the cassettes or stacks of the invention are not particularly limited. Typically each flow field and/or membrane assembly will be between about 1 $cm^2$ and about 1 $m^2$, however larger and smaller flow field layers and/or membrane assembly layers may be suitable in certain applications. The layer size and number of layers in the fuel cell cassettes of the invention may be configured to produce a sufficient power supply for a variety of applications. Frequently the power output fuel cell cassettes and fuel cell cassettes of the invention will range from about 0.1 W to about 100 kW or more preferably from about 0.5 W to about 1 or about 10 kW. Other preferred fuel cell cassettes of the invention will range from about 5 W to about 1 kW.

The resin or sealant used for encapsulation is selected such that it has the required chemical and mechanical properties for the conditions found in an operating fuel cell system (oxidative stability, for example). Appropriate resins/sealants include both thermoplastics and thermoset elastomers. Preferred thermoplastics include thermoplastic olefin elastomers, thermoplastic, polyurethanes, plastomers, polypropylene, polyethylene, polytetrafluoroethylene, fluorinated polypropylene and polystyrene. Preferred thermoset elastomers include epoxy resins, urethanes, silicones, fluorosilicones, and vinyl esters.

The pressure differential and time required to accomplish the sealing process is a function of the materials used in the fuel cell cassette construction. These include the sealant channel geometry, the viscosity and flow characteristics of the resin, and the type of gas diffusion layer used in the MEA. Those skilled in the art will be able to judge the appropriate time and pressure based on these parameters. Those practicing the invention may also ascertain the most appropriate time and pressure by visual inspection during the sealing process with the use of transparent molds through which the resin progress can be seen in the topmost layer of the assembly.

Preferred fuel cell cassettes of the present invention are further illustrated by means of the following illustrative embodiment, which is given for the purpose of illustration only and is not meant to limit the invention to the particular components and amounts disclosed therein.

EXAMPLE 1

Vacuum Assisted Resin Transfer Molding

Figure 15:
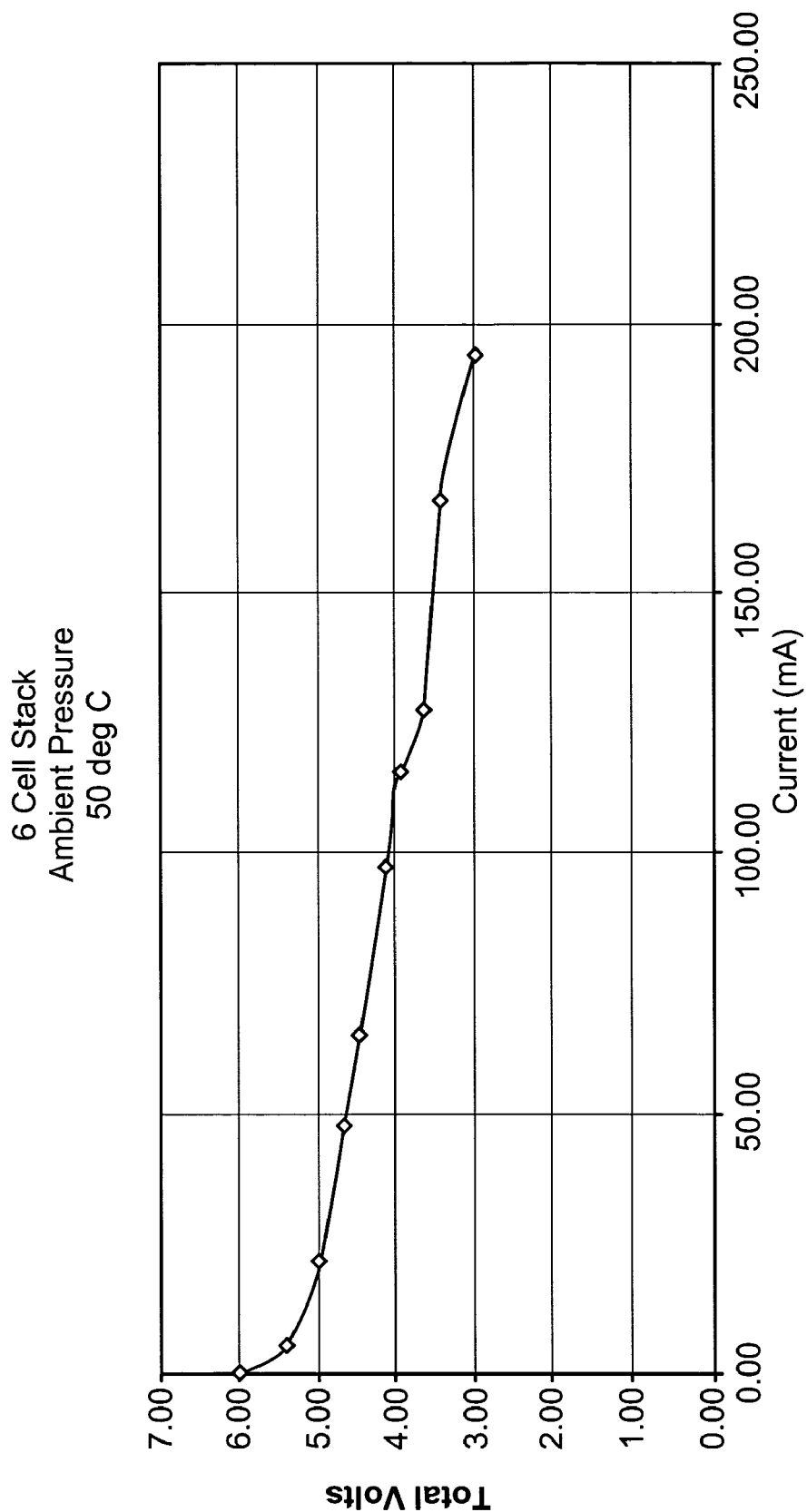
FIG. 15 is a plot of the current and voltage curve of the fuel cell cassettes made via the processes described in Example 1.

Using the groove and sealant hole pattern depicted in FIG. 3, bipolar plates were machined in polymer graphite composite (with the oxidant flow field shown on one side and the fuel flow field on the other). MEAs were made using known processes and cut according to the pattern shown in FIG. 7, e.g., cut nominally to the same outside dimensions as the bipolar plates with the same pattern of manifold holes. Six MEAs, five bipolar plates, and two terminal plates were assembled in the mold shown in FIG. 8 in the following order: terminal plate, MEA, bipolar plate, MEA, bipolar plate, MEA, bipolar plate, MEA, bipolar plate, MEA, bipolar plate, MEA, terminal plate. The assembly was encapsulated with the silicone resin, Silastic M, (available commercially from The Dow Corning Corporation of Midland, Mich., USA) by applying a vacuum of 23 inches Hg for approximately 90 seconds. (See also FIG. 15 for a plot of the current and voltage curve of the fuel cell cassettes made via the processes described in Example 1.)

EXAMPLE 2

Pressure Assisted Resin Transfer Molding

A fuel cell stack was fabricated from endplates, composite MEAs and bipolar plates via encapsulation in silicone. Endplates were machined from aluminum with treaded holes corresponding to manifolds for hydrogen in and out, air in and out, and cooling in and out, as well as holes for the addition of sealant. These endplates were coated with gold to improve their contact resistance and corrosion stability, thereby functioning as endplates and current collectors. MEAs were cut from a larger 5 layer piece (membrane with catalyst and gas diffusion layer on each side) and a silicone gasket was bonded to the periphery (see FIG. 13 for example). Holes were punched in the gasket portion of the MEAs corresponding to the manifolds ports and sealant holes. Bipolar plates were machined from graphite polymer composite with two varieties; with a fuel and an oxidant flow fields [A-A'] and with a fuel flow field and a coolant flow field [A-B] or an oxidant flow field and a coolant flow field [A'-B]. The stack was made with the following sequence of parts:

Endplate, bipolar plate [B-A], MEA, bipolar plate [A'-A], MEA, bipolar plate [A'-B], bipolar plate [B-A], MEA, Bipolar plate [A'-A], MEA, bipolar plate [A'-B], Endplate This assembly was placed in a mold similar to that shown in FIG. 8 and lightly clamped in place. A two part silicone Silastic T2, (available commercially from The Dow Corning Corporation of Midland, Mich., USA) was pumped by hand (<5 PSI) through a static mixer into each of the four sealant ports. The uncured silicone travels through the sealant manifolds and throughout the stack via the sealant channels. The exterior of the stack was surrounded with the uncured resin by continuing to push resin-through the sealant manifolds, thereby flushing out any entrained air. The stack and mold were cured quickly by one hour in a 80° C. oven. Once the resulting fuel cell stack was freed from the mold, it was leak tested to 10 PSI to ensure adequate sealing throughout.

In some modes of operation, it may be preferable to add some clamping to this fuel cell stack (especially if the reactants are to be at pressures of greater than a few PSI). This can be accomplished by any external mechanical means. In addition, we have added screws through the interior of the stack by inserting them into the sealant holes after the sealant and encapsulation step (but before the sealant cures). The result is an internal means of compression that has been encapsulated within the fuel cell. Screws and nuts can be used, alternatively one can tread the sealant holes in the bottom endplate, such that the inserted screws will thread through the top endplate and into the bottom endplate. It may also be advantageous to add an electrically insulating layer to the screws (i.e. insulation sleeves) to prevent shorting within the stack components.

EXAMPLE 3

Pressure Assisted Resin Transfer Molding II

A fuel cell stack was fabricated from endplates, composite MEAs and bipolar plates via encapsulation in silicone. Endplates were machined from ABS plastic with holes corresponding to manifolds for hydrogen in and out, air in and out, and cooling in and out, as well as holes for the addition of sealant (see FIG. 19 and FIG. 20B for example). Silicone tubes were fashioned with a lip to fit within the endplate holes corresponding to the various flows (see FIG. 20C for example). Current collectors fabricated from flat sheet copper coated with gold to improve their contact resistance (see FIG. 20A for example). Wires were soldered to the current collectors. MEAs were cut from a larger 5 layer piece (membrane with catalyst and gas diffusion layer on each side) and a silicone gasket was bonded to the periphery (see FIG. 13 for example). Holes were punched in the gasket portion of the MEAs corresponding to the manifold ports and sealant holes. Bipolar plates were machined from graphite polymer composite with two varieties; with a fuel flow field and an oxidant flow field (which bipolar plates typically possess rotational symmetry ($C_2$) [A-A'] and with a fuel flow field and a coolant flow field [A-B] or an oxidant flow field and a coolant flow field [A'-B]. Similarly, terminal plates were fashioned with only one flow field and a flat side to face the current collector. The stack was made with the following sequence of parts:

Endplate with silicon tubes inserted, current collector with bonded wire, terminal plate [A], MEA, bipolar plate [A'-A], MEA, bipolar plate [A'-B], bipolar plate [B-A], MEA, Bipolar plate [A'-A], MEA, terminal plate [A'] current collector with bonded wire, Endplate This assembly was placed in a mold similar to that shown in FIG. 8 and lightly clamped in place. A two part silicone Silastic T2, (available commercially from The Dow Corning Corporation of Midland, Mich., USA) was pumped by hand (<25 PSI) through a static mixer into each of the four sealant ports. The uncured silicone travels through the sealant manifolds and throughout the stack via the sealant channels. The exterior of the stack was surrounded with the uncured resin by continuing to push resin through the sealant manifolds, thereby flushing out any entrained air. The stack and mold were cured quickly by one hour in an 80° C. oven. Once the resulting fuel cell stack was freed from the mold, it was leak tested to 10 PSI to ensure adequate sealing throughout.

In some modes of operation, it may be preferable to add some clamping to this fuel cell stack (especially if the reactants are to be at pressures of greater than a few PSI). This can be accomplished by any external mechanical means. In addition, we have added screws through the interior of the stack by inserting them into the sealant holes after the sealant and encapsulation step (but before the sealant cures). The result is an internal means of compression that has been encapsulated within the fuel cell. Screws and nuts can be used, alternatively one can tread the sealant holes in the bottom endplate, such that the inserted screws will thread through the top endplate and into the bottom endplate. It may also be advantageous to add an electrically insulating layer to the screws (i.e. insulation sleeves) to prevent shorting within the stack components.

EXAMPLE 4

Standard Injection Molding

Few changes would be made in the above described scheme to employ automated injection molding. With the use of two part resins (e.g., the silicone used in Example 1), we have shown that the resin can be injected into the channels by a driving pressure rather than pulling a vacuum on the internal ports. For traditional injection molding of a thermoplastic resin, the mold used would have to accommodate the temperature and pressure associated. Molten resin would be injected into the injection holes and around the edges of the assembly, allowed to cool and harden. Injection velocity profile, pack pressure, and cooling time would be optimized to minimize the possibility of component damage as well as to control shrinkage/warpage ensuring sealing of the final part. Lastly, the fuel cell cassette would be removed from the mold.

The foregoing description of the present invention is merely illustrative thereof, and it is understood that variations and modification can be made without departing from the spirit or scope of the invention.

What is claimed is:

1. An electrochemical cassette comprising:
   at least one membrane electrode assembly adapted for contact with at least two plates, each plate comprising opposing substantially planar surfaces with a peripheral wall extending there between, at least one of the substantially planar surfaces defining one or more flow fields, each of which comprises at least one groove, the flow fields being selected from the group consisting of an oxidant flow field, a fuel flow field, and a coolant flow field;
   wherein each membrane electrode assembly and each plate comprise at least one oxidant manifold opening and at least one fuel manifold opening wherein each respective manifold opening extends through the thickness of the cassette;
   wherein each plate has at least one sealant channel which extends through at least a portion of the thickness thereof;
   wherein the one or more membrane electrode assemblies and plates are assembled and encapsulated about the peripheral wall thereof by a sealant; and
   wherein the sealant contemporaneously seals the respective channels of the one or more plates to selectively block those reactant manifold openings which are not intended to deliver material to a particular flow field.

2. The electrochemical cassette of claim 1, wherein each membrane electrode assembly and each plate further comprise at least one coolant manifold opening wherein each coolant manifold opening extends through the thickness of the cassette.

3. The electrochemical cassette of claim 1, wherein each plate has zero or one oxidant flow field and has zero or one fuel flow field.

4. The electrochemical cassette of claim 1, wherein each membrane electrode assembly is in contact with a fuel flow field and an oxidant flow field.

5. The electrochemical cassette according to any one of claims 1 through 4, wherein the electrochemical cassette is a fuel cell cassette.

6. The fuel cell cassette of claim 5, wherein each manifold opening is an opening having a cross section which is substantially the same as the area defined by the channel surrounding the manifold opening and the periphery of the plate.

7. The electrochemical cassette of claim 2, comprising at least one plate having a coolant flow field.

8. The electrochemical cassette of claim 2, comprising a first plate having a first coolant flow field and a second plate having a second coolant flow field which are aligned such that the first and second flow fields are in contact.

9. The fuel cell cassette of claim 5, wherein at least one sealant channel is interposed between each membrane electrode assembly and each plate or between adjacent plates.

10. The fuel cell cassette of claim 5, wherein each flow field comprises a plurality of interconnected grooves extending through a portion of the plate through which material can flow.

11. The fuel cell cassette of claim 5, wherein each membrane electrode assembly comprises an ion conductive layer interposed between two gas diffusion layers which comprise a catalyst.

12. The fuel cell cassette of claim 11, wherein each membrane electrode assembly has substantially the same cross section as the fuel cell cassette.

13. The fuel cell cassette of claim 11, wherein each membrane electrode assembly comprises a composite membrane electrode assembly having an ion conductive layer interposed between gas diffusion layers and a gasket surrounding the periphery of the laminate.

14. The fuel cell cassette of claim 13, wherein at least a portion of the sealant channel is adjacent to the gasket of the membrane electrode assembly.

15. The fuel cell cassette of claim 13, wherein the sealant channel is adjacent to the interface of the gasket and laminate of the membrane electrode assembly.

16. The fuel cell cassette of claim 13, wherein substantially the entire sealant channel is in contact with the gasket of the membrane electrode assembly.

17. The fuel cell cassette of claim 13, wherein substantially the entire sealant channel is in contact with the gas diffusion layer of the membrane electrode assembly.

18. The electrochemical cassette according to any one of claims 1 through 4, wherein the sealant is a thermoset or thermoplastic material.

19. The electrochemical cassette of claim 18, wherein the thermoplastic material is selected from the group consisting of thermoplastic olefin elastomers, thermoplastic polyurethane, plastomer, polypropylene, polyethylene, polytetrafluoroethylene, fluorinated polypropylene and polystyrene.

20. The electrochemical cassette of claim 18, wherein the sealant has a viscosity of between 10,000 and 150,000 cP.

21. The electrochemical cassette of claim 18, wherein the sealant has a viscosity of between 10,000 and 55,000 cP.

22. The electrochemical cassette of claim 18, wherein the thermoset material is selected from the group consisting of epoxy resins, urethanes, silicones, fluorosilicones, and vinyl esters.

23. The electrochemical cassette of claim 1, wherein at least a portion of the sealant channels open to the peripheral edge of one or more plates of the cassette such that the sealant is introduced into the sealant channel during encapsulation of the cassette.

24. The electrochemical cassette of claim 1, wherein each membrane electrode assembly and plate further comprises at least one sealant hole extending through the thickness thereof, and wherein the sealant holes are in contact with at least a portion of one or more sealant channels.

25. The electrochemical cassette of claim 24, wherein at least a portion of the sealant channels are open to the peripheral edge of one or more plates of the cassette.

26. The electrochemical cassette of claim 25, wherein the sealant is introduced into the fuel cell cassette through one or more of the sealant holes or through the sealant channel openings about the periphery of the plates.

27. The electrochemical cassette of claim 26, wherein the sealant is introduced by pressure assisted resin transfer or by vacuum assisted resin transfer.

28. The electrochemical cassette of claim 27, wherein the sealant is introduced under a pressure differential of between about +15 psi and about −15 psi.

29. The electrochemical cassette of claim 27, wherein the sealant is introduced by pressure assisted resin transfer under a positive pressure of between 0 psi and about 50 psi.

30. The electrochemical cassette of claim 27, wherein the sealant is introduced by vacuum assisted resin transfer under a partial pressure of between about 750 Torr and about 1 mTorr.

31. A fuel cell stack comprising:
   (a) at least one electrochemical cassette according to any one of claims 1 through 4;

(b) two end plates having one or more openings which align with the reactant manifold opening(s);

wherein the end plates are assembled on the top and bottom of the stack of one or more electrochemical cassettes such that the openings in the end plates align with the fuel manifold openings, the oxidant openings, and optionally the coolant manifold openings.

32. The fuel cell stack of claim 31, wherein each of the end plates are assembled with the electrochemical cassette(s) prior to encapsulation by the resin and prior to introduction of the sealant such that the end plates and fuel cell cassettes(s) are encapsulated and sealed in combination.

33. The fuel cell stack of claim 32, wherein a compression means is applied to the stack to provide additional compressive force to the fuel cell stack.

34. The fuel cell stack of claim 31, wherein the end plates are attached to one or more electrochemical cassettes after encapsulation of the electrochemical cassette(s).

35. The fuel cell stack of claim 34, wherein the end plates are attached by a compressive seal.

36. The fuel cell stack of claim 35, wherein a compression means is applied to the stack to provide a compressive force to the fuel cell stack.

37. The fuel cell stack of claim 31, wherein at least one of the end plates is composed of a thermoset polymer, a thermoplastic polymer, a metal, or a metal alloy.

38. The fuel cell stack of claim 31, wherein at least one of the end plates is composed of a filled polymer composite.

39. The fuel cell stack of claim 38, wherein the filled polymer composite is a glass fiber reinforced thermoplastic or a graphite reinforced thermoplastic.

40. The fuel cell stack of claim 31, further comprising one or more current collectors encapsulated therein.

41. The fuel cell stack of claim 40, wherein each of the encapsulated current collectors is positioned on a portion of the endplate internal to the fuel cell stack.

42. The fuel cell stack of claim 41, wherein the current collector comprises one or more conductive materials.

43. The fuel cell stack of claim 42, wherein conductive materials are selected from the group consisting of gold and copper.

44. The fuel cell stack of claim 43, wherein the copper is applied over the gold to form a composite encapsulated current collector.

45. The fuel cell stack of claim 31, further comprising integrated tube fittings adapted to provide inlet and outlet ports for fuel, oxidant and optionally coolant flow.

46. The fuel cell stack of claim 45, wherein the integrated tube fittings are comprised of silicone.

47. The fuel cell stack of claim 45, wherein each of the integrated tube fittings comprises an integral tube having a sealing ridge at a lower portion thereof in proximity to the endplate which, upon compression of the stack and introduction of sealant thereto, bonds to said endplate.

* * * * *